US012763801B2

(12) United States Patent
Nam et al.

(10) Patent No.: US 12,763,801 B2
(45) Date of Patent: Oct. 13, 2026

(54) ELECTRONIC DEVICE COMPRISING FRONTEND MODULE FOR COMMUNICATING THROUGH WIRELESS LAN

(71) Applicant: SAMSUNG ELECTRONICS CO., LTD., Suwon-si (KR)

(72) Inventors: Janghyun Nam, Suwon-si (KR); Hyoseok Na, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 191 days.

(21) Appl. No.: 18/533,093

(22) Filed: Dec. 7, 2023

(65) Prior Publication Data

US 2024/0128991 A1 Apr. 18, 2024

Related U.S. Application Data

(63) Continuation of application No. PCT/KR2023/008151, filed on Jun. 13, 2023.

(30) Foreign Application Priority Data

Sep. 16, 2022 (KR) ........................ 10-2022-0117470
Oct. 12, 2022 (KR) ........................ 10-2022-0130990

(51) Int. Cl.
*H04B 1/00* (2006.01)
*H04B 1/401* (2015.01)
(Continued)

(52) U.S. Cl.
CPC ........... *H04B 1/0064* (2013.01); *H04B 1/401* (2013.01); *H04B 1/406* (2013.01); *H04W 76/15* (2018.02); *H04W 88/06* (2013.01)

(58) Field of Classification Search
CPC ...... H04B 1/0064; H04B 1/401; H04B 1/406; H04W 72/04; H04W 76/15; H04W 84/12; H04W 88/06
See application file for complete search history.

(56) References Cited

U.S. PATENT DOCUMENTS 7,693,544 B2 * 4/2010 Segev .................. H04B 1/0053 455/132
8,260,257 B2 * 9/2012 Huotari ................... H04L 63/18 455/435.2
(Continued)

FOREIGN PATENT DOCUMENTS

CN 212811906 U 3/2021
CN 113873645 A 12/2021
(Continued)

OTHER PUBLICATIONS

International Search Report & Written Opinion for PCT/KR2023/008151 by Korean Intellectual Property Office dated Sep. 22, 2023.
(Continued)

*Primary Examiner* — Dominic E Rego
(74) *Attorney, Agent, or Firm* — NIXON & VANDERHYE P.C.

(57) ABSTRACT

An electronic device includes a wireless communication circuit for a wireless LAN, a first frontend module connected to the wireless communication circuit, a second frontend module connected to the wireless communication circuit, a first antenna connected to the first frontend module, a second antenna connected to the second frontend module, a third antenna connected to the second frontend module, and a processor. The processor is configured to provide a first signal in 5 GHz band or 6 GHz band to the first frontend module. The processor is configured to set a first operation mode of the first operation mode for transmitting a signal related to wireless LAN, and a second operation mode, and
(Continued)

the processor is configured to set to provide a second signal in the 5 GHz band or the 6 GHz band to the second frontend module while the first signal is provided to the first frontend module.

20 Claims, 11 Drawing Sheets

(51) Int. Cl.
*H04B 1/403* (2015.01)
*H04W 76/15* (2018.01)
*H04W 88/06* (2009.01)

(56) References Cited

U.S. PATENT DOCUMENTS 8,811,247 B2* 8/2014 Thomson ................ H04L 12/12 455/343.2
9,565,566 B1 2/2017 Boppana et al.
10,404,316 B1* 9/2019 Song ........................ H04L 7/033
10,531,518 B2 1/2020 Amini et al.
11,159,147 B2 10/2021 Jo et al.
11,223,375 B2 1/2022 Kim et al.
11,271,573 B2 3/2022 Lee et al.
11,405,059 B2 8/2022 Pehlke
11,539,411 B2 12/2022 Cho
11,943,809 B2* 3/2024 Jang .................. H04W 72/0446
12,047,813 B2* 7/2024 Sevindik ............... H04W 24/08
12,144,042 B2 11/2024 Mann et al.
2011/0070921 A1* 3/2011 Karaoguz ............... H04L 63/08 455/552.1
2013/0222121 A1* 8/2013 Shen ...................... G08C 17/02 340/12.22
2016/0021660 A1* 1/2016 Krishnamurthy ........................... H04W 72/0453 455/452.1
2017/0070375 A1* 3/2017 Bachl ..................... H04L 5/0007
2017/0111918 A1* 4/2017 Jechoux ............ H04W 72/1215
2019/0342449 A1* 11/2019 Rauenbuehler ....... H04M 3/465
2020/0082263 A1* 3/2020 Song ...................... G06N 3/045
2020/0220256 A1* 7/2020 Cetinoneri ............... H01Q 1/38
2020/0313701 A1* 10/2020 Xiong ..................... H04B 1/006
2020/0321698 A1* 10/2020 Jo .......................... H01Q 5/307
2020/0328725 A1* 10/2020 Jo .......................... H03H 7/175
2020/0336996 A1* 10/2020 Van ........................ H04W 52/52
2020/0382149 A1* 12/2020 Nagamori .............. H04B 1/006
2021/0159926 A1* 5/2021 Kim ........................ H04B 1/401
2021/0243072 A1* 8/2021 Peterson ............. G06F 11/2012
2021/0273325 A1* 9/2021 Santhakumar ........... H01Q 1/42
2021/0399429 A1* 12/2021 Garrido Lopez ........ H01Q 1/44
2022/0069848 A1 3/2022 Han et al.
2022/0302933 A1 9/2022 Nam et al.
2022/0416819 A1 12/2022 Kim et al.
2023/0110435 A1 4/2023 Yu
2023/0114899 A1* 4/2023 Ay ............................ G01S 7/03 342/70
2023/0189064 A1* 6/2023 Monajemi ........... H04W 72/542 370/329
2023/0232452 A1 7/2023 Li et al.
2023/0269061 A1* 8/2023 Golat ................... H04B 1/0057 370/278

FOREIGN PATENT DOCUMENTS

CN 114258148 A 3/2022
KR 10-2020-0119686 A 10/2020
KR 10-2211745 B1 1/2021
KR 10-2021-0034991 A 3/2021
KR 10-2021-0111991 A 9/2021
KR 10-2438424 B1 9/2022
KR 10-2694249 B1 8/2024
WO 2017/034672 A1 3/2017
WO 2021/150002 A1 7/2021
WO WO2022108838 A1 5/2022

OTHER PUBLICATIONS

Extended European Search Report dated Nov. 11, 2025 for EP Application No. 23865662.3.
Office Action for KR Application No. 10-2022-0130990 issued Sep. 10, 2026 and English translation, 13 pages.

* cited by examiner

ELECTRONIC DEVICE COMPRISING FRONTEND MODULE FOR COMMUNICATING THROUGH WIRELESS LAN

CROSS-REFERENCE TO RELATED APPLICATION

This application is a continuation application of International Application No. PCT/KR2023/008151 filed on Jun. 13, 2023, which claims priority from and derives the benefit of Korean Patent Application No. 10-2022-0117470 filed in the Korean Intellectual Property Office on Sep. 16, 2022, and Korean Patent Application No. 10-2022-0130990 filed in the Korean Intellectual Property Office on Oct. 12, 2022, the entire contents of which are incorporated by reference herein in their entirety.

TECHNICAL FIELD

The present disclosure relates generally to wireless communication, and more particularly to a method and an electronic device comprising a frontend module for communication through a wireless local area network (LAN).

BACKGROUND

Advancement in the wireless LAN field is still evolving. For example, discussions are still underway on the 802.11be standard. Accordingly, integrated circuits or frontend modules (or frontend circuits) according to the 802.11be standard are also still being developed. An electronic device according to the 802.11be standard may support multi-link operation. The electronic device supporting the multi-link operation may communicate with at least one external electronic device by using a plurality of channels (or links).

SUMMARY

According to an embodiment, an electronic device may comprise a wireless communication circuit, a first frontend module connected with the wireless communication circuit, a second frontend module connected with the wireless communication circuit, a first antenna connected with the first frontend module, a second antenna connected with the second frontend module, a third antenna connected with the second frontend module, and a processor comprising circuitry, wherein the circuitry may be configured to provide a first signal in 5 GHZ band and 6 GHz band to the first frontend module by using a wireless communication circuit, and while an operation mode of the second frontend module is set to a first operation mode of the first operation mode for transmitting a signal related to wireless local area network (LAN) and a second operation mode for transmitting a signal related to cellular communication and the first signal is provided to the first frontend module, provide a second signal in the 5 GHZ band and the 6 GHz band to the second frontend module by using the wireless communication circuit, wherein the first signal may be transmitted through the first antenna connected with the first frontend module, and wherein the second signal may be transmitted through at least one of the second antenna and the third antenna.

According to some embodiments, a method of an electronic device may comprise providing a first signal in 5 GHz band and 6 GHz band to a first frontend module included in the electronic device and connected with the wireless communication circuit by using a wireless communication circuit included in the electronic device, and while an operation mode of a second frontend module included in the electronic device and connected with the wireless communication circuit is set to a first operation mode of the first operation mode for transmitting a signal related to wireless local area network (LAN) and a second operation mode for transmitting a signal related to cellular communication and the first signal is provided to the first frontend module, providing a second signal in the 5 GHz band and the 6 GHz band to the second frontend module by using the wireless communication circuit, wherein the first signal may be transmitted through a first antenna included in the electronic device and connected with the first frontend module, and wherein the second signal may be transmitted through at least one of a second antenna or a third antenna which are included in the electronic device and connected with the second frontend module.

BRIEF DESCRIPTION OF THE DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present disclosure are now described, by way of example only, and regarding the accompanying figures, in which.

DETAILED DESCRIPTION

Figure 1:
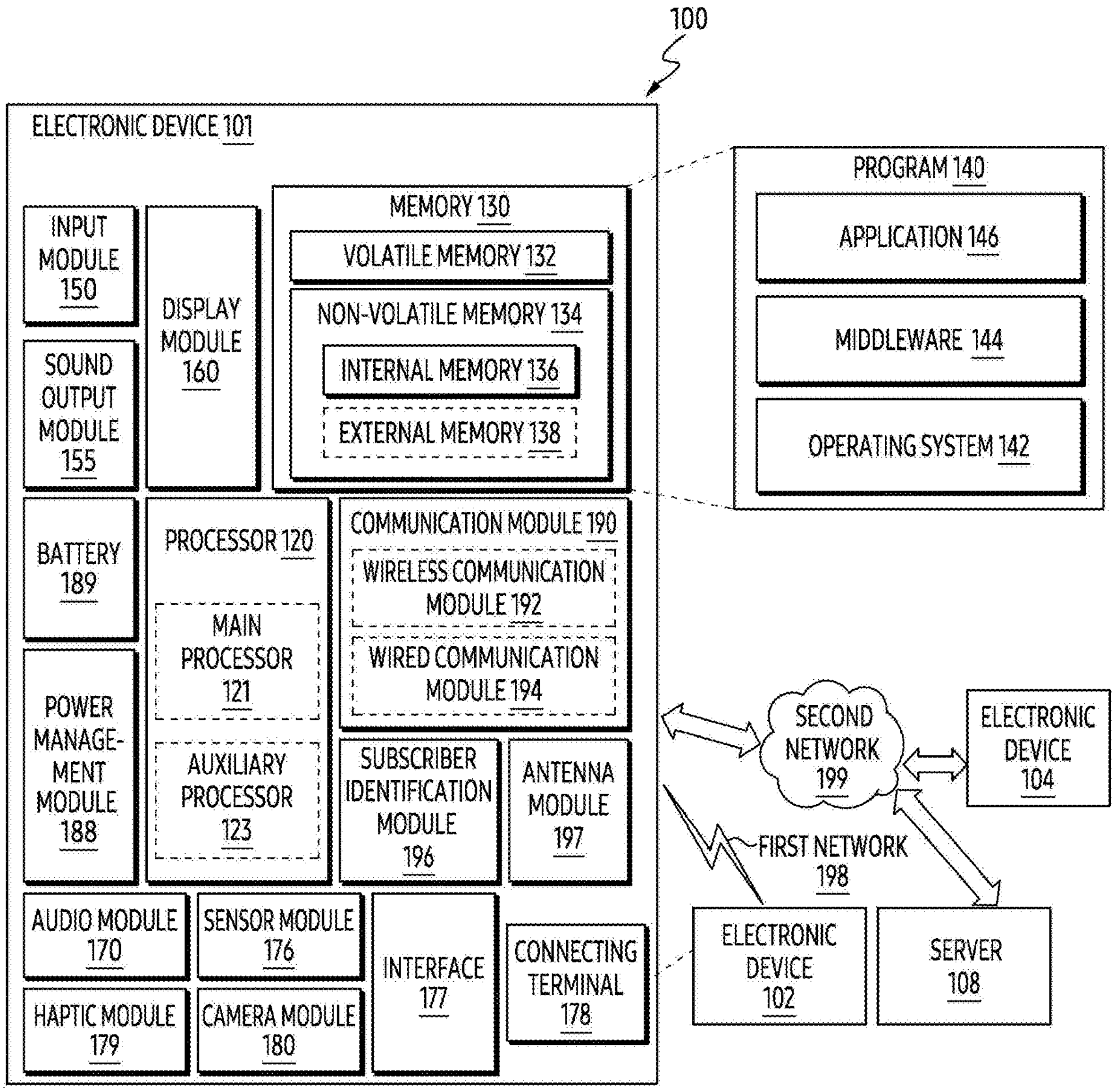
FIG. 1 is an exemplary block diagram of an electronic device in a network environment, according to an embodiment.

In the present document, the word “exemplary” is used herein to mean “serving as an example, instance, or illustration.” Any embodiment or implementation of the present disclosure described herein as “exemplary” is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

As used herein, the term "module", "unit", "circuit' and "circuitry" can be used interchangeably and will be described in further detail herein.

The terms "comprises", "comprising", "includes", "including", "have", "having", "contains", "containing", "carries", "carrying", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. By way of example, each of the phrases "at least one of A, B, and C" or "at least one of A, B, or C" refers to only A, only B, or only C; any combination of A, B, and C; and/or at least one of each of A, B, and C.

FIG. 1 is an exemplary block diagram illustrating an electronic device 101 in a network environment 100, according to various embodiments of the present disclosure.

In some embodiments, a "module" or "unit" may include a processor and a memory. The "processor" may be or may include processing circuitry, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" may be or may include any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor may be in electronic communication with the processor.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
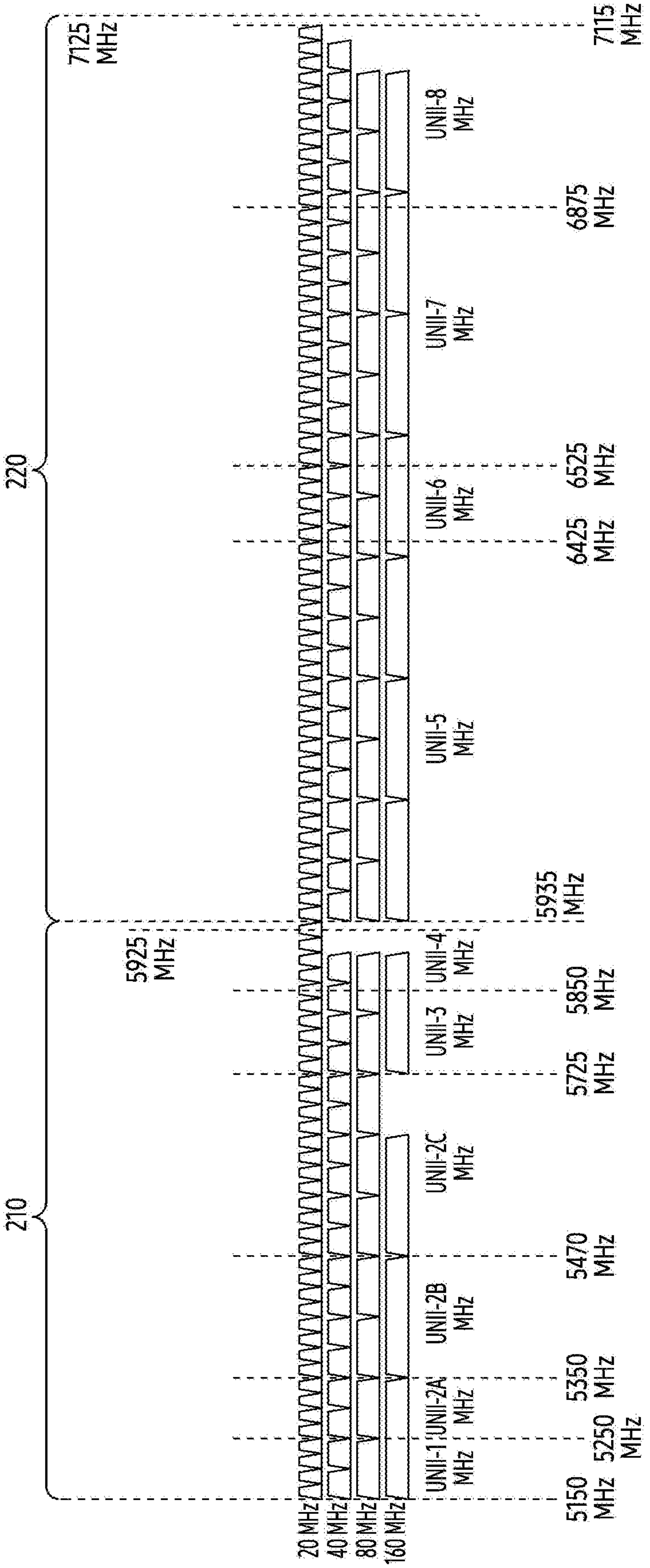
FIG. 2 illustrates an exemplary channel set in 5 GHz band to 6 GHz band, according to an embodiment.

FIG. 2 illustrates an exemplary channel set in 5 GHz band to 6 GHz band, according to an embodiment.

Referring to FIG. 2, a plurality of channels may be set in 5 GHz band 210 to 6 GHZ band 220. For example, the plurality of channels set in the 5 GHz band 210 may be set in 5.150 GHz to 5.935 GHZ. The 5 GHz band 210 may include unlicensed national information infrastructure (UNII)-1, UNII-2, UNII-3, and UNII-4. For example, the plurality of channels set in the 6 GHz band 220 may be set in 5.935 GHz to 7.125 GHZ. The 6 GHz band 220 may include UNII-5, UNII-6, UNII-7, and UNII-8. For example, a channel index may be set for a plurality of channels set within the 5 GHz band 210 to the 6 GHz band 220, respectively.

For example, a bandwidth of each of the plurality of channels set in the 5 GHz band 210 to 6 GHz band 220 may be set to at least one of 20 MHz, 40 MHz, 80 MHz, 160 MHZ, and 320 MHz. For example, the number of 20 MHz channels in the 5 GHz band 210 may be set to 38 (or 36). For example, the number of 40 MHz channels in the 5 GHz band 210 may be set to 18. For example, the number of 80 MHz channels in the 5 GHz band 210 may be set to 9. For example, the number of 160 MHz channels in the 5 GHz band 210 may be set to four. For example, the number of 20 MHz channels in the 6 GHz band 220 may be set to 59. For example, the number of 40 MHz channels in the 6 GHz band 220 may be set to 29. For example, the number of 80 MHz channels in the 6 GHz band 220 may be set to 14. For example, the number of 160 MHz channels in the 6 GHz band 220 may be set to 7.

The plurality of channels set in the 5 GHz band 210 to 6 GHz band 220 illustrated in FIG. 2 are exemplary, and frequency ranges or channel indexes may be changed according to the country in which the plurality of channels are used. Although FIG. 2 illustrates a channel configured to 20, 40, 80, and 160 MHz, it is not limited thereto. In addition to the illustrated channels, 240 MHz channels or 320 MHz channels may be added.

According to an embodiment, the plurality of channels set in the 5 GHz band 210 to 6 GHz band 220 may be used for a wireless local area network. In addition, a plurality of channels set in the 2.4 GHz band may be used for wireless LAN, together with the plurality of channels set in the 5 GHz band 210 to 6 GHz band 220.

Figure 3A:
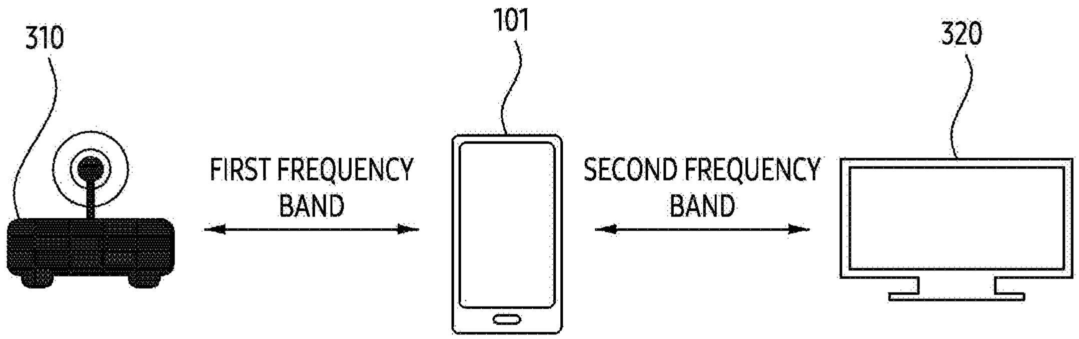
FIG. 3A illustrates an operation of an electronic device supporting an RSDB, according to an embodiment.

FIG. 3A illustrates an exemplary operation of an electronic device supporting an RSDB, according to an embodiment.

Referring to FIG. 3A, the electronic device 101 may support a real simultaneous dual band (RSDB) operation. The RSDB may refer to a technology for simultaneously connecting different frequency bands in a wireless LAN module.

For example, the electronic device 101 may establish a connection with a first external electronic device 310 by using a channel in a first frequency band (e.g., the 2.4 GHZ band). The electronic device 101 may establish a connection with a second external electronic device 320 by using a channel in a second frequency band (e.g., the 5 GHz band). For example, the electronic device 101 may perform communication through a channel in the first frequency band using the first core (or a first processing circuit) in the electronic device 101. The electronic device 101 may perform communication through a channel in the second frequency band using a second core (or a second processing circuit) in the electronic device 101. The electronic device 101 may simultaneously communicate with the first external electronic device 310 and the second external electronic device 320 using different cores. For example, the electronic device 101 may communicate with the first external electronic device 310 that performs functions of an access point (AP). The electronic device 101 may perform communication with the second external electronic device 320 through a peer-to-peer (P2P) connection.

According to an embodiment, the electronic device 101 may communicate with the first external electronic device 310 and the second external electronic device 320 using different cores. For example, the electronic device 101 may allocate 2.4 GHz 2×2 to a channel for communicating with the first external electronic device 310 and allocate 5 GHz 2×2 to a channel for communicating with the second external electronic device 320, based on 2×2 MIMO. For example, the electronic device 101 may allocate 6 GHZ 2×2 to a channel for communicating with the second external electronic device 320. Accordingly, the electronic device 101 may simultaneously establish a connection with the first external electronic device 310 and the second external electronic device 320 in different bands.

According to an embodiment, in the electronic devices 101, a physical layer (PHY layer) and a medium access control layer (MAC layer) may be separated from each other according to frequency bands, in order to operate simultaneously in the first frequency band (e.g., the 2.4 GHz band) and the second frequency band (e.g., the 5 GHz band). Therefore, the throughput performance of the electronic device 101 may depend on a core in the 2.4 GHZ band. For example, the maximum throughput of a modulation and coding scheme (MCS) 11 of the 5 GHz band or the 6 GHz band may be 2400 Mbps. The maximum throughput of the MCS 11 in the 2.4 GHz band may be 230 Mbps. Therefore, when the electronic device 101 is operated according to the AP connection (e.g., a connection with the first external electronic device 310) and the P2P connection (e.g., a connection with the second external electronic device 320), the maximum throughput may be 230 Mbps. In other words, when the electronic device 101 is operated according to the AP connection and the P2P connection, the performance of the electronic device 101 may be limited.

Figure 3B:
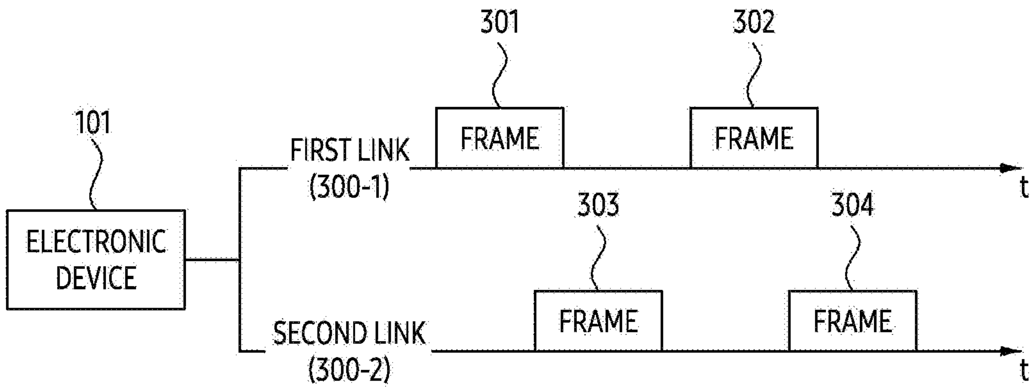
FIG. 3B illustrates an operation of an electronic device supporting multi-links operation, according to an embodiment.

FIG. 3B illustrates an exemplary operation of an electronic device supporting multi-links operation, according to an embodiment.

Referring to FIG. 3B, the electronic device 101 according to the 802.11be standard may support multi-links. The electronic device 101 may perform communication through multi-links. For example, the electronic devices 101 may communicate through a first link 300-1 in the first frequency band (e.g., the 2.4 GHz band) and communicate through a second link 300-2 in the second frequency band (e.g., the 5 GHz band). For example, the electronic device 101 may perform communication through the first link 300-1 and the second link 300-2 within the second frequency band (e.g., the 5 GHz band).

According to an embodiment, the electronic device 101 may communicate with the first external electronic device 310 through the first link 300-1, and communicate with the second external electronic device 320 through the second link 300-2. For example, the first link 300-1 may be included in the first frequency band. The second link 300-2 may be included in the second frequency band.

According to an embodiment, the communication with the first external electronic device 310 through the first link 300-1 and the communication with the second external electronic device 320 through the second link 300-2 may be performed independently. For example, the electronic device 101 may transmit a frame 301 (e.g., physical layer protocol data unit (PPDU)) to the first external electronic device 310 through the first link 300-1. The electronic device 101 may receive a frame 302 from the first external electronic device 310 through the first link 300-1. The electronic device 101 may receive a frame 303 from the second external electronic device 320 through the second link 300-2. The electronic device 101 may transmit a frame 304 to the second external electronic device 320 through the second link 300-2. According to an embodiment, the electronic device 101 may communicate with the first external electronic device 310 (e.g., the AP) through both the first link 300-1 and the second link 300-2.

According to an embodiment, the first link 300-1 may be set in the 5 GHz band. The second link 300-2 may be set in the 6 GHz band. For example, the electronic device 101 may transmit a signal in the first link 300-1 by using the first core. The electronic device 101 may receive a signal in the second link 300-2 by using the second core. For example, the electronic device 101 may transmit and receive a signal on the first link 300-1 by using the first core. The electronic device 101 may transmit and receive a signal on the second link 300-2 by using the second core.

According to an embodiment, a signal transmitted from the first link 300-1 may cause interference with a signal transmitted and received from the second link 300-2. Interference may occur in the signal transmitted from the second link 300-2 by leakage of a spectrum mask of the signal transmitted from the first link 300-1.

For example, in a similar transmission and reception (STR) mode, the electronic device 101 may independently transmit and receive a signal without mutual link interference. Since interference between links may occur in a non-similar transmission and reception (NSTR) mode, the electronic device 101 may wait without receiving a signal on the second link 300-2, while transmitting a signal on the first link 300-1. For example, when the antenna is isolated by a sufficient interval so that the signals of the transmitter and receiver do not interfere with each other, the electronic device 101 may operate in the STR mode. When the antenna is not isolated by the sufficient interval, the electronic device 101 may operate in the NSTR mode.

According to an embodiment, the electronic device 101 may operate as a multi-link single radio (MLSR) or an enhanced multi-link single radio (eMLSR) in a single radio. The electronic device 101 may operate as a multi-link multi-radio (MLMR) in a multi-radio. When the electronic device is operated as the MLMR, throughput may increase compared to when the electronic device is operated as the MLSR or the eMLSR.

In the following specification, a structure of an electronic device (e.g., the electronic devices 101) and examples of the electronic device (e.g., the electronic devices 101) for performing multi-links operation (or the RSRB operation) in the 5 GHz band and the 6 GHZ band may be described. For example, an electronic device (e.g., the electronic device 101) may include four antennas used for fifth generation new radio (5G NR). For example, an electronic device (e.g., the electronic device 101) may use at least a part of the four antennas used for 5G NR for wireless LAN.

Figure 4:
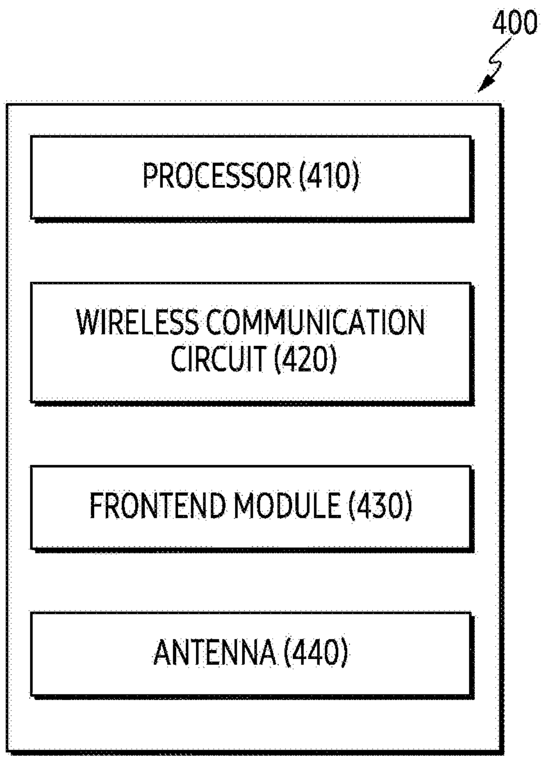
FIG. 4 illustrates a simplified block diagram of an electronic device, according to an embodiment.

FIG. 4 illustrates an exemplary simplified block diagram of an electronic device, according to an embodiment.

Referring to FIG. 4, an electronic device 400 may include a processor 410, a wireless communication circuit 420, a frontend module 430, and/or an antenna 440. According to an embodiment, the electronic device 400 may include at least one of the processor 410, the wireless communication circuit 420, the frontend module 430, and the antenna 440. For example, at least a part of the processor 410, the wireless communication circuit 420, the frontend module 430, and the antenna 440 may be omitted according to embodiments.

According to an embodiment, the processor 410 may be operably coupled with or connected with the wireless communication circuit 420 and the frontend module 430. The fact that the processor 410 may be operably coupled with or connected with the wireless communication circuit 420 and the frontend module 430 may mean that the wireless communication circuit 420 and the frontend module 430 may be controlled by the processor 410. For example, the processor 410 may control the wireless communication circuit 420. The processor 410 may control the frontend module 430. For example, the processor 410 may be configured with at least one processor. The processor 410 may include at least one processor. For example, the processor 410 may include a communication processor (CP).

According to an embodiment, the processor 410 may include hardware component for processing data based on one or more instructions. For example, the hardware component for processing data may include arithmetic and logic unit (ALU), field programmable gate array (FPGA), and/or central processing unit (CPU).

According to an embodiment, the wireless communication circuit 420 may include a plurality of cores for processing data based on radio access technology (RAT). For example, the wireless communication circuit 420 may perform communication by using a part or all of the plurality of cores included in the wireless communication circuit 420. For example, the plurality of cores included in the wireless communication circuit 420 may be used for Bluetooth communication and/or wireless LAN (or wireless LAN communication).

For example, the wireless communication circuit 420 may generate an RF signal by converting a baseband signal generated by the processor 410 (e.g., a communication processor). The wireless communication circuit 420 may provide the RF signal to the frontend module 430.

According to an embodiment, the frontend module 430 may include at least one of a controller, a switch circuit, a matching network circuit, a power amplifier (PA), a duplexer, a low noise amplifier (LNA), and a filter. For example, in frontend module 430, the received RF signal may be filtered through the filter (e.g., a band pass filter). The filtered RF signal may be amplified through the LNA and provided to the wireless communication circuit 420. For example, in the frontend module 430, the RF signal provided by the wireless communication circuit 420 may be amplified through the PA and transmitted through the antenna 440. According to an embodiment, the frontend module 430 may be referred to as a frontend circuit.

According to an embodiment, the frontend module 430 may include a plurality of frontend modules. For example, a part (e.g., four) of the plurality of frontend modules may be used to transmit and receive a signal based on wireless LAN (or Bluetooth communication). Another part (e.g., two) of the plurality of frontend modules may be used to transmit and receive a signal based on 5G NR.

According to an embodiment, the antenna 440 may include a plurality of antennas. For example, a part (e.g., two) of the plurality of antennas may be used to transmit a signal in the 2.4 GHz band, a signal in the 5 GHz band, and/or a signal in the 6 GHz band. For example, a part (e.g., two) of the plurality of antennas may be used to receive a signal in the 2.4 GHZ band, a signal in the 5 GHz band, and/or a signal in the 6 GHz band. For example, a part (e.g., one or two) of the plurality of antennas may be used to transmit a signal in band n77 (e.g., 3300 MHz to 4200 MHZ), band n78 (e.g., 3300 MHz to 3800 MHZ), and/or band n79 (e.g., 4400 MHz to 5000 MHZ). For example, a part (e.g., four) of the plurality of antennas may be used to receive a signal in the band n77, band n78, and/or band n79.

For example, the antenna 440 may be used to transmit a wireless signal based on an electrical signal received from the frontend module 430. For example, the antenna 440 may be used to output an electrical signal corresponding to the wireless signal received from the frontend module 430, in response to receiving a wireless signal from the outside.

According to an embodiment, the electronic device 400 may further include a diplexer (or at least one diplexer) and a switch circuit (or at least one switch) for connecting the frontend module 430 and the antenna 440. For example, the diplexer may include at least one filter for distinguishing a signal in the 2.4 GHz band and a signal in a 5 GHz or higher band. For example, the switch circuit may be used to control the signal provided from the frontend module 430 to the antenna 440 and/or the signal provided from the antenna 440 to the frontend module 430.

Figure 5:
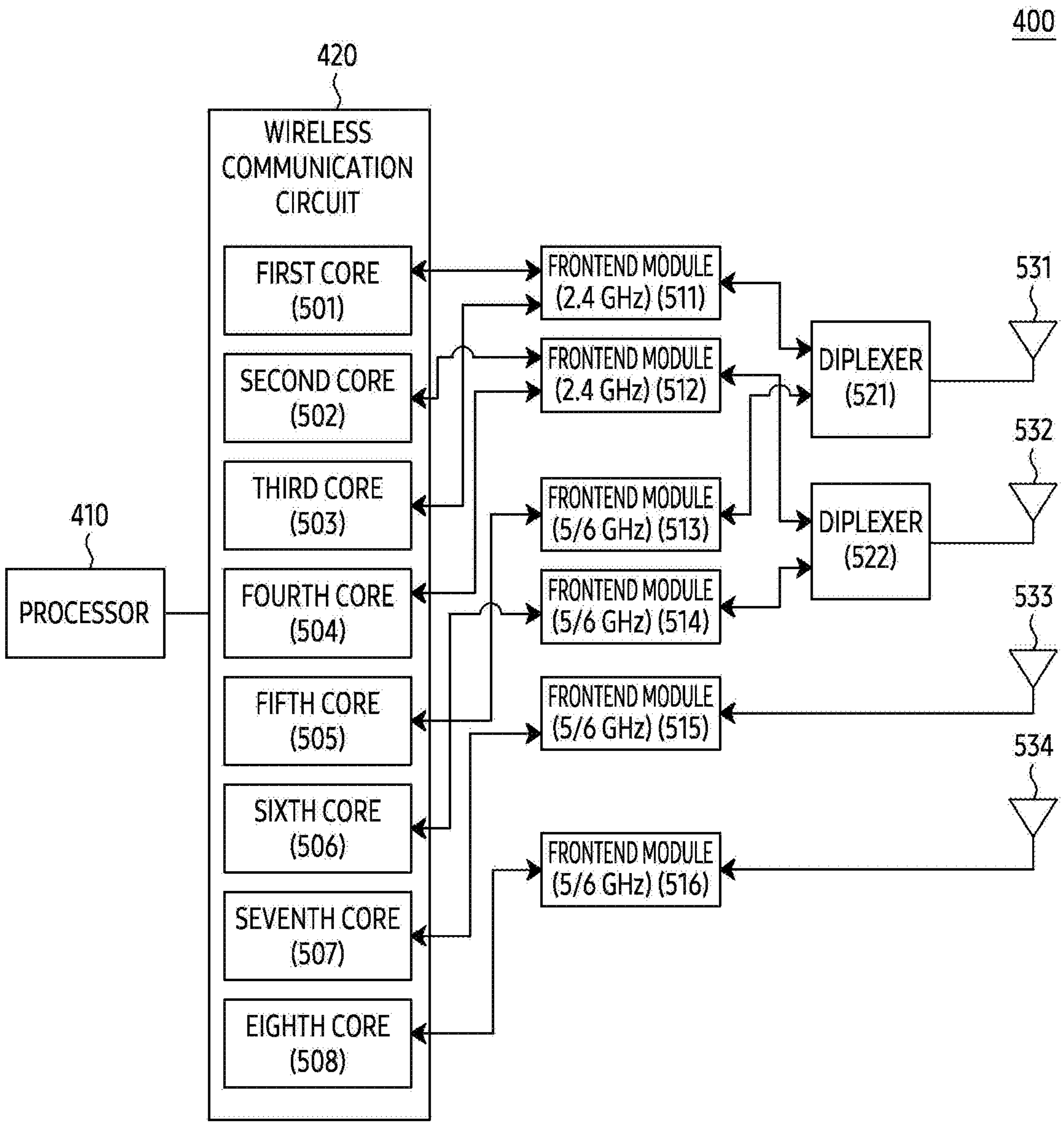
FIG. 5 illustrates components included in an electronic device and an electrical path between components, according to an embodiment.

FIG. 5 illustrates exemplary components included in an electronic device and an electrical path between components, according to an embodiment.

Referring to FIG. 5, the processor 410 may be connected to the wireless communication circuit 420. The wireless communication circuit 420 may be connected to the frontend module 430. The frontend module 430 may be electrically connected to the antenna 440. Although not illustrated, the processor 410 may be connected to the frontend module 430.

According to an embodiment, the wireless communication circuit 420 may be used to process (or configure) signals based on Bluetooth communication and wireless LAN (or wireless LAN communication). For example, the wireless communication circuit 420 may include a first core 501 to an eighth core 508. For example, the first core 501 and a second core 502 may be used to process (or configure) a signal based on Bluetooth communication in the 2.4 GHz band. For example, a third core 503 and a fourth core 504 may be used to process (or configure) a signal based on wireless LAN in the 2.4 GHz band. For example, a fifth core 505 and a sixth core 506 may be used to process (or configure) a signal based on wireless LAN with a bandwidth of 160 MHz or less within the 5 GHz band and the 6 GHz band. For example, a seventh core 507 and an eighth core 508 may be used to process (or configure) a signal based on wireless LAN with a bandwidth of 320 MHz or less within the 5 GHz band and the 6 GHZ band.

According to an embodiment, the electronic device 400 may include a frontend module 511, a frontend module 512, a frontend module 513, a frontend module 514, a frontend module 515, and/or a frontend module 516. In FIG. 5, bands (e.g., 2.4 GHz or 5/6 GHZ) related to the frontend module 511 to the frontend modules 515 are shown, but this is for convenience of description, and the frontend module may process signals of various frequency bands in addition to the illustrated bands.

For example, the frontend module 511 may be connected to the first core 501 and the third core 503. The frontend module 511 may be used to amplify a wireless signal in the 2.4 GHz band received from the first core 501 and/or the third core 503 to match transmission power.

For example, the frontend module 512 may be connected to the second core 502 and the fourth core 504. The frontend module 512 may be used to amplify a wireless signal in the 2.4 GHz band received from the second core 502 and/or the fourth core 504 to match transmission power.

For example, the frontend module 513 may be connected to the fifth core 505. The frontend module 513 may be used to amplify a signal in the 5 GHz or higher band (e.g., 5 GHz band and 6 GHz band) received from the fifth core 505, having a bandwidth of 160 MHz or less, and based on a wireless LAN, to match transmission power.

For example, the frontend module 514 may be connected to the sixth core 506. The frontend module 514 may be used to amplify a signal in the 5 GHz or higher band (e.g., 5 GHz band and 6 GHz band) received from the sixth core 506, having a bandwidth of 160 MHz or less, and based on a wireless LAN, to match transmission power.

For example, the frontend module 515 may be connected to the seventh core 507. The frontend module 515 may be used to amplify a signal in the 5 GHz or higher band (e.g., 5 GHz band and 6 GHz band) received from the seventh core 507, having a bandwidth of 320 MHz or less, and based on a wireless LAN, to match transmission power.

For example, the frontend module 516 may be connected to the eighth core 508. The frontend module 516 may be used to amplify a signal in the 5 GHz or higher band (e.g., 5 GHz band and 6 GHz band) received from the eighth core 508, having a bandwidth of 320 MHz or less, and based on a wireless LAN, to match transmission power.

According to an embodiment, the electronic device 400 may include an antenna 531, an antenna 532, an antenna 533, and an antenna 534. For example, the antenna 531 may be electrically connected to the frontend module 511 and the frontend module 513 through a diplexer 521. For example, the antenna 532 may be electrically connected to the frontend module 512 and the frontend module 514 through a diplexer 522. For example, the antenna 533 may be connected to the frontend module 515. For example, the antenna 534 may be connected to the frontend module 516.

According to an embodiment, a core for transmitting a wireless LAN signal in the 2.4 GHz band (e.g., the third core 503 and the fourth core 504) may be distinguished from a core for transmitting a wireless LAN signal in the 5 GHz or higher band (e.g., the fifth core 505) to the eighth core 508). According to an embodiment, a core for processing (or configuring) a signal of a bandwidth of 160 MHz or less in the 5 GHz or higher band and a core for processing (or configuring) a signal of a bandwidth of 320 MHz or less in the 5 GHz or higher band may be separated.

According to an embodiment, FIG. 5 illustrates that the third core 503 and the fifth core 505 are separated and operated independently, but the third core 503 and the fifth core 505 may be implemented as one core to operate. Although FIG. 5 illustrates that the fourth core 504 and the sixth core 506 are separated and operated independently, the fourth core 504 and the sixth core 506 may be implemented as one core to operate. For example, the electronic device 400 may be implemented with four cores related to the wireless LAN. Multiple-input and multiple-output (MIMO) and multi-core may be supported by implementing the antennas 531 to 534 for each core in the electronic device 400. Therefore, the electronic device 400 may independently perform wireless LAN communication in the 2.4 GHz band and wireless LAN communication in the 5 GHz or higher band, within the band associated with the wireless LAN.

Although not illustrated, the fifth core 505 and the sixth core 506 may not be used due to a lack of space in the electronic device 400 in which the antenna is to be disposed. For example, the frontend module 513 and the frontend module 514 connected to the fifth core 505 and the sixth core 506 may not be included in the electronic device 400. In this case, the multi-link multi-radio (MLMR) function in the 5 GHz band and the 6 GHz band may not be supported in the electronic device 400. The processor 410 of the electronic device 400 may only support the enhanced multi-link single radio (eMLSR) function and/or the multi-link single radio (MLSR) function with single radio. When operating real simple dual band (RSDB) in the electronic device 400, cores (e.g., third core 503 and fourth core 504) in the 2.4 GHz band and cores (e.g., the seventh core 507 and the eighth core 508) in the 5 GHz or higher band may be simultaneously used. The core in the 2.4 GHz band and the core in the 5 GHz or higher band operate independently, but the performance of throughput may depend on the core in the 2.4 GHz band. For example, since throughput in the 5 GHz or higher band (e.g., the 5 GHz band and the 6 GHz band) is up to 5.76 Gbps, but throughput in the 2.4 GHz band is up to 298 Mbps, performance limitations may occur.

Figure 6:
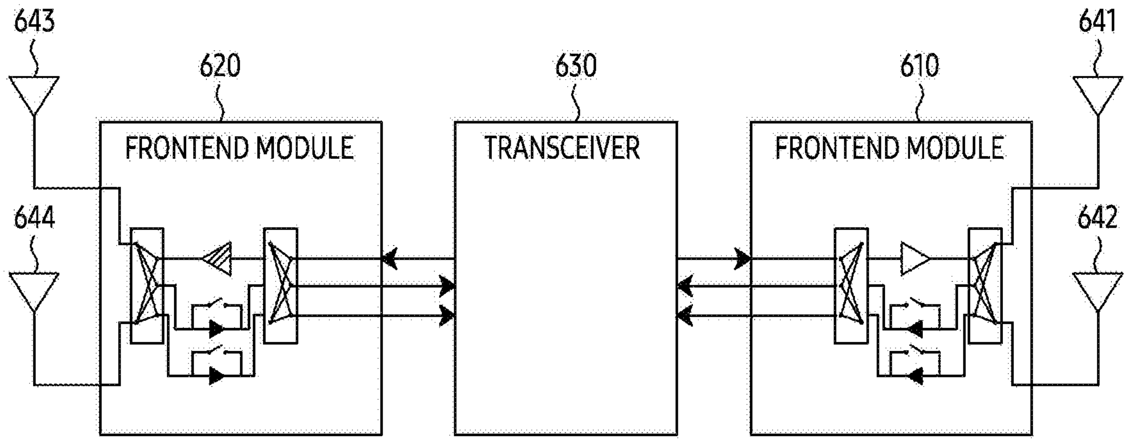
FIG. 6 illustrates components for 5G NR and an electrical path between components, according to an embodiment.

FIG. 6 illustrates exemplary components for 5G NR and an electrical path between components, according to an embodiment.

Referring to FIG. 6, the electronic device 400 may support a 5G NR ultra-high band (UHB). According to an embodiment, the electronic device 400 may support 2Tx MIMO and 4Rx. As the electronic device 400 supports 2Tx MIMO and 4Rx, coverage and throughput may be increased, and frequency resources may be used efficiently.

According to an embodiment, the electronic device 400 may include a frontend module 610, a frontend module 620, a transceiver 630, an antenna 641, an antenna 642, an antenna 643, and an antenna 644 for transmitting and receiving a signal (or the RF signal) based on 5G NR. For example, the signal based on 5G NR may include band n77

(e.g., 4200 MHZ from 3300 MHZ), band n78 (e.g., 3800 MHZ from 3300 MHZ), and/or band n79 (e.g., 5000 MHz from 4400 MHZ).

For example, the transceiver 630 may be used to transmit and receive the signal based on 5G NR. Although not illustrated, the transceiver 630 may be connected to the processor 410. The transceiver 630 may be controlled by the processor 410. The processor 410 may convert a baseband signal generated by the processor 410 into an RF signal by using the transceiver 630. The processor 410 may provide the RF signal to at least one of the frontend module 610 and/or the frontend module 620 by using the transceiver 630. The processor 410 may control the frontend module 610 and/or the frontend module 620 using the transceiver 630 to process the RF signal transmitted from the wireless communication circuit 420.

For example, each of the frontend module 610 and the frontend module 620 may include at least one of a controller, a switch circuit, a matching network circuit, a PA, a duplexer, an LNA, and a filter. The processor 410 (or the transceiver 630) may change a path through which the RF signal are transmitted and received by controlling the switch circuit (or controller) included in the frontend module 610 and frontend module 620.

For example, an antenna 641, an antenna 642, an antenna 643, and an antenna 644 may be used to transmit and receive a RF signal based on 5G NR. For example, the antenna 641 and the antenna 642 may be used to transmit a RF signal provided from the frontend module 610. The antenna 641 and the antenna 642 may be used to provide a RF signal received from the outside to the frontend module 610. For example, the antenna 643 and the antenna 644 may be used to transmit a RF signal provided from the frontend module 620. The antenna 643 and the antenna 644 may be used to provide a RF signal received from the outside to the frontend module 620.

Figure 7:
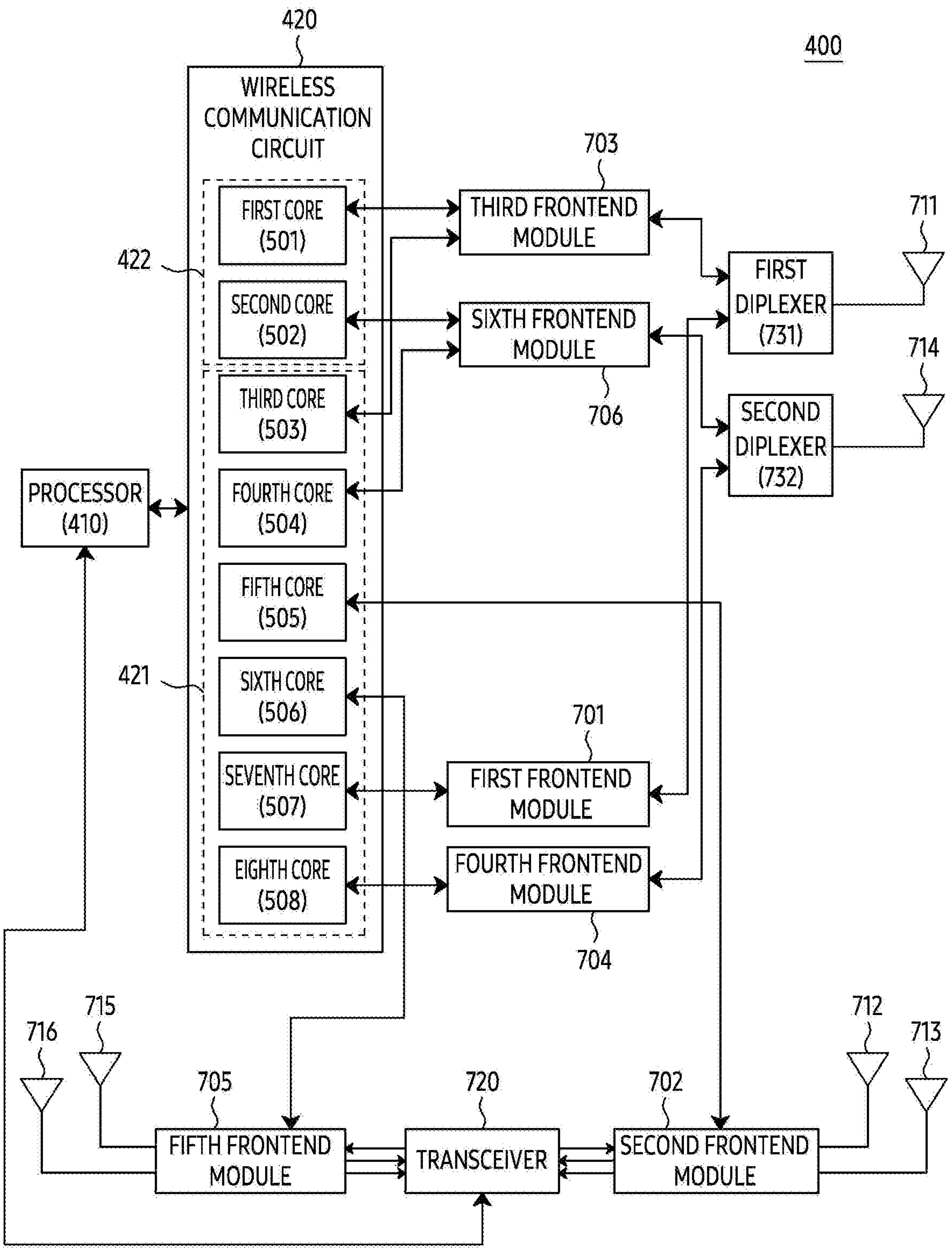
FIG. 7 illustrates components included in an electronic device and an electrical path between components, according to an embodiment.

FIG. 7 illustrates exemplary components included in an electronic device and an electrical path between components, according to an embodiment.

Figure 8:
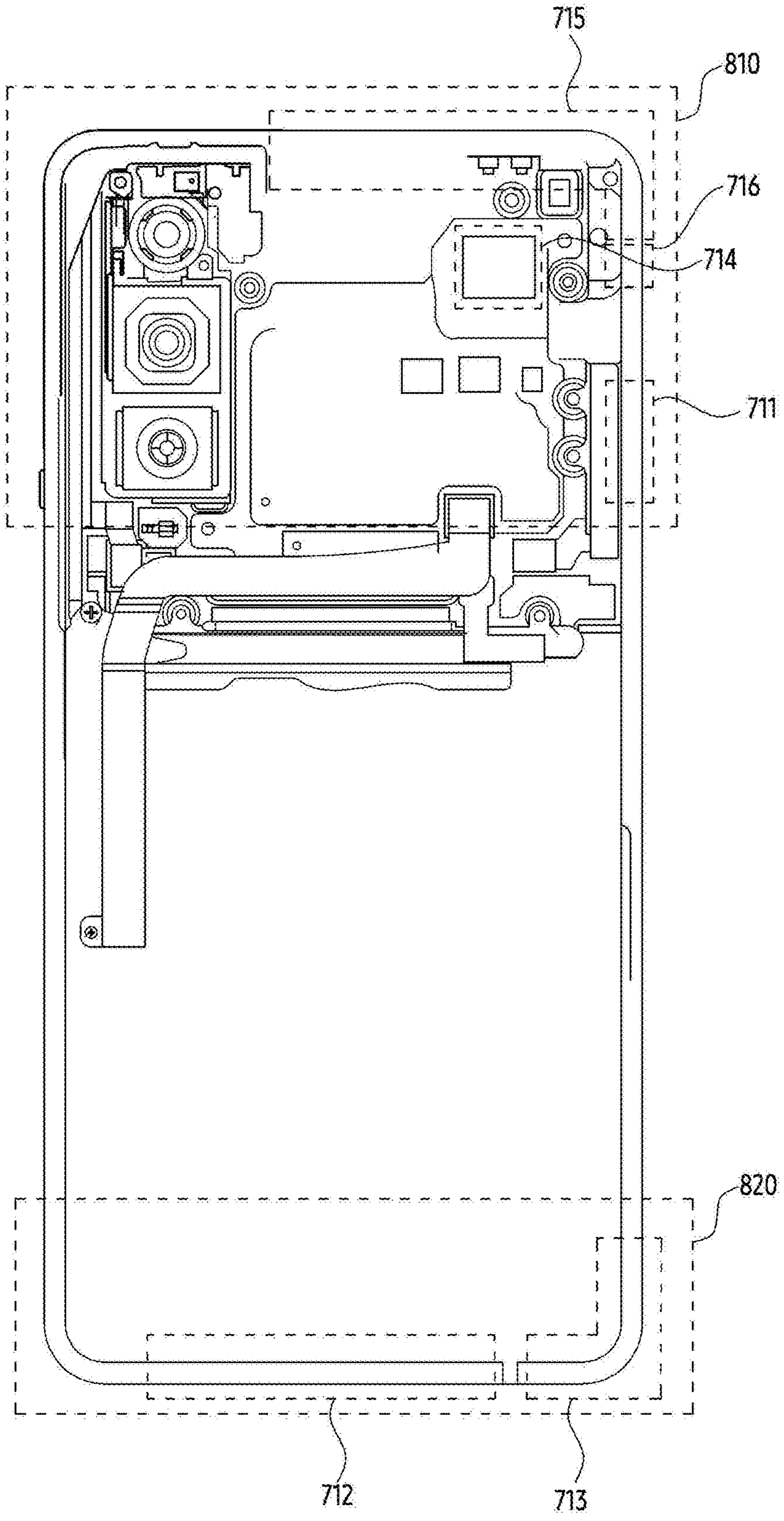
FIG. 8 illustrates an example of a plurality of antennas included in an electronic device, according to an embodiment.

FIG. 8 illustrates an example of a plurality of antennas included in an electronic device, according to an embodiment.

According to an embodiment, the electronic device 400 may perform an operation based on the 802.11be standard (or Wi-Fi 7). The electronic device 400 may include at least one core (e.g., the seventh core 507 and the eighth core 508) to support the 802.11be standard. As the at least one core is included, the electronic device 400 may include four antennas for wireless LAN. However, it may be difficult to include all four antennas for wireless LAN due to a lack of mounting space of the electronic device 400.

According to an embodiment, the electronic device 400 may set at least a part of the antennas for the 5G NR to be used for the wireless LAN. For example, when an MLO operation and/or an RSDB operation is performed, the processor 410 may give priority to the wireless LAN using the wireless LAN and LTE Coex algorithm, by using a core for processing signals below the bandwidth of 320 MHz in the 5 GHz or higher band (e.g., the 5 GHz band and the 6 GHz band) as the main core and a core for processing signals below the bandwidth of 160 MHZ in the band above 5 GHz (e.g., the 5 GHz band and the 6 GHz band) as a supplementary core.

Referring to FIG. 7, the fifth core 505 and the sixth core 506 for processing signals below the bandwidth of 160 MHz in the 5 GHz or higher band (e.g., the 5 GHz band and the 6 GHz band) may be electrically connected to a second frontend module 702 and a fifth frontend module 705 for 5G NR, respectively. For example, the second frontend module 702 may correspond to the frontend module 610 of FIG. 6. The fifth frontend module 705 may correspond to the frontend module 620 of FIG. 6.

The processor 410 (or the communication processor) may be connected to the wireless communication circuit 420. For example, the wireless communication circuit 420 may include a wireless communication circuit 421 for wireless LAN and a wireless communication circuit 422 for Bluetooth communication. For example, the processor 410 may control to transmit and/or receive signal based on Bluetooth communication by transmitting a control signal to the wireless communication circuit 421.

For example, the wireless communication circuit 422 may include the first core 501 and the second core 502. The wireless communication circuit 421 may include the third core 503 to the eighth core 508. For example, the first core 501 and the second core 502 may be used to process (or configure) a signal based on Bluetooth communication in the 2.4 GHz band. For example, the third core 503 and the fourth core 504 may be used to process (or configure) a signal based on wireless LAN in the 2.4 GHz band. For example, the fifth core 505 and the sixth core 506 may be used to process (or configure) a signal based on wireless LAN with a bandwidth of 160 MHz or less in the 5 GHz band and the 6 GHz band. For example, the seventh core 507 and the eighth core 508 may be used to process (or configure) a signal based on wireless LAN with a bandwidth of 320 MHz or less in the 5 GHz band and the 6 GHz band. According to an embodiment, although FIG. 7 illustrates that the third core 503 and the fifth core 505 are separated and operated independently, the third core 503 and the fifth core 505 may be implemented as one core and operated. Although FIG. 7 illustrates that the fourth core 504 and the sixth core 506 are separated and operated independently, the fourth core 504 and the sixth core 506 may be implemented as one core and operated.

According to an embodiment, the wireless communication circuit 420 may be connected to the first frontend module 701 to the sixth frontend module 706.

According to an embodiment, the first frontend module 701 may be connected to the wireless communication circuit 421. The first frontend module 701 may be connected to the seventh core 507 included in the wireless communication circuit 421. The first frontend module 701 may be electrically connected to the first antenna 711 through the first diplexer 731. For example, the first frontend module 701 may be used to amplify a signal in the 5 GHz or higher band (e.g., the 5 GHz band and the 6 GHz band) provided from the seventh core 507, having a bandwidth of 320 MHz or less, and based on a wireless LAN, to match transmission power. For example, the first frontend module 701 may be used to amplify a signal based on a wireless LAN received from the first antenna 711.

According to an embodiment, the second frontend module 702 may be connected to the wireless communication circuit 421. The second frontend module 702 may be connected to the fifth core 505 included in the wireless communication circuit 421. The second frontend module 702 may be connected to the second antenna 712 and the third antenna 713. For example, the second frontend module 702 may be used to amplify a signal in the 5 GHz or higher band (e.g., the 5 GHz band and the 6 GHz band) provided from the fifth core 505, having a bandwidth of 160 MHz or less, and based on the wireless LAN, to match transmission power. For example, the second frontend module 702 may be used to amplify signal based on a wireless LAN, received from at least one of the second antenna 712 and the third antenna 713.

According to an embodiment, the second frontend module 702 may be connected to the transceiver 720. The second frontend module 702 may be used to transmit and/or receive a signal based on cellular communication (e.g., the 5G NR). For example, the signal based on cellular communication may include band n77 (e.g., 3300 MHz to 4200 MHZ), band n78 (e.g., 3300 MHz to 3800 MHZ), and/or band n79 (e.g., 4400 MHz to 5000 MHZ). For example, the second frontend module 702 may transmit the signal based on cellular communication (e.g., the 5G NR) provided by the transceiver 720, by using at least one of the second antenna 712 and the third antenna 713. For example, the second frontend module 702 may be used to amplify a signal provided from at least one of the second antenna 712 and the third antenna 713.

According to an embodiment, the third frontend module 703 may be connected to the wireless communication circuit 420. For example, the third frontend module 703 may be electrically connected to the third core 503 of the wireless communication circuit 421 and the first core 501 of the wireless communication circuit 422. The third frontend module 703 may be electrically connected to the first antenna 711 through the first diplexer 731. For example, the third frontend module 703 may be used to amplify a signal (e.g., a signal based on Bluetooth communication and a signal based on wireless LAN) in a band of 2.4 GHz received from the first core 501 and the third core 503. For example, the third frontend module 703 may be used to amplify wireless signals (e.g., a signal based on Bluetooth communication and a signal based on wireless LAN) received from the first antenna 711.

According to an embodiment, the fourth frontend module 704 may be connected to the wireless communication circuit 421. For example, the fourth frontend module 704 may be electrically connected to the eighth core 508 included in the wireless communication circuit 421. The fourth frontend module 704 may be electrically connected to the fourth antenna 714 through the second diplexer 732. For example, the fourth frontend module 704 may be used to amplify a signal in the 5 GHz or higher band (e.g., the 5 GHz band and the 6 GHz band) provided from the eighth core 508, having a bandwidth of 320 MHz or less, and based on the wireless LAN, to match transmission power. For example, the fourth frontend module 704 may be used to amplify a signal based on a wireless LAN received from the fourth antenna 714.

According to an embodiment, the fifth frontend module 705 may be connected to the wireless communication circuit 421. For example, the fifth frontend module 705 may be electrically connected to the sixth core 506 included in the wireless communication circuit 421. For example, the fifth frontend module 705 may be connected to the fifth antenna 715 and the sixth antenna 716. For example, the fifth frontend module 705 may be used to amplify a signal in a 5 GHz or higher band (e.g., the 5 GHz band and the 6 GHz band) provided from the sixth core 506, having a bandwidth of 160 MHz or less, and based on the wireless LAN, to match transmission power. For example, the fifth frontend module 705 may be used to amplify a signal based signal a wireless LAN received from at least one of the fifth antenna 715 and the sixth antenna 716.

According to an embodiment, the fifth frontend module 705 may be connected to the transceiver 720. The fifth frontend module 705 may be used to transmit and/or receive a signal based on cellular communication (e.g., the 5G NR). For example, a signal based on cellular communication may include band n77 (e.g., 3300 MHz to 4200 MHZ), band n78 (e.g., 3300 MHz to 3800 MHZ), and/or band n79 (e.g., 4400 MHz to 5000 MHZ). For example, the fifth frontend module 705 may transmit a signal based on cellular communication (e.g., 5G NR) provided by the transceiver 720 by using at least one of the fifth antenna 715 and the sixth antenna 716. For example, the fifth frontend module 705 may be used to amplify a signal provided from at least one of the fifth antenna 715 and the sixth antenna 716.

According to an embodiment, the sixth frontend module 706 may be connected to the wireless communication circuit 420. For example, the sixth frontend module 706 may be electrically connected to the fourth core 504 of the wireless communication circuit 421 and the second core 502 of the wireless communication circuit 422. The sixth frontend module 706 may be electrically connected to the fourth antenna 714 through the second diplexer 732. For example, the sixth frontend module 706 may be used to amplify a wireless signal (e.g., a signal based on Bluetooth communication and a signal based on wireless LAN) in the 2.4 GHz band received from the second core 502 and/or the fourth core 504, to match transmission power. For example, the sixth frontend module 706 may be used to amplify a wireless signal (e.g., a signal based on Bluetooth communication and a signal based on wireless LAN) received from the fourth antenna 714.

According to an embodiment, the processor 410 may use the seventh core 507 and/or the eighth core 508 as a main core. For example, the processor 410 may use the fifth core 505 and/or the sixth core 506 as a supplementary core. For example, the processor 410 may use the fifth core 505 and/or the sixth core 506 when the MLO operation and/or the RSDB operation is performed. For example, the processor 410 may transmit and/or receive a signal based on wireless LAN, by using the second frontend module 702 and/or the fifth frontend module 705, when the MLO operation and/or RSDB operation is performed. For example, the second frontend module 702 and the fifth frontend module 705 may be used to transmit and/or receive signals based on the cellular communication. For example, the second frontend module 702 and the fifth frontend module 705 may be configured to be used for both the wireless LAN and the cellular communication. Therefore, the electronic device 400 may not include an additional frontend module for transmitting a wireless LAN signal having a bandwidth of 160 MHz or less, in the 5 GHz or higher band in the fifth core 505 and the sixth core 506.

According to an embodiment, the processor 410 may communicate with an external electronic device by using both the wireless LAN and the cellular communication. For example, the processor 410 may set the second frontend module 702 and the fifth frontend module 705 to be used for the wireless LAN during a specified time period when the MLO operation and/or RSDB operation is performed. The processor 410 may set the second frontend module 702 and the fifth frontend module 705 to be used for the wireless LAN during the specified time period, by setting priority to the operation for the wireless LAN during the specified time period. The processor 410 may set the signals transmitted in the band (e.g., the 5G NR) for the cellular communication (e.g., n77 band, n78 band, and n79 band) and the signals transmitted in the band (e.g., the 5 GHz band and the 6 GHz band) for the wireless LAN to not collide with each other, by setting the second frontend module 702 and the fifth frontend module 705 to be used for the wireless LAN during the specified time period.

For example, the processor 410 may set the second frontend module 702 and the fifth frontend module 705 to be used for the wireless LAN until the MLO operation and/or RSDB operation is finished.

For example, the processor 410 may set the second frontend module 702 and the fifth frontend module 705 to be used for the wireless LAN during the specified time period, by using a coex algorithm for the Bluetooth communication, the wireless LAN, and the cellular communication. The processor 410 may set the second frontend module 702 and the fifth frontend module 705 to be used for the wireless LAN during the specified time period, by controlling a PA and/or an LNA (or a switch circuit connected to the PA and/or the LNA) included in the second frontend module 702 and the fifth frontend module 705. According to an embodiment, the processor 410 may directly control the second frontend module 702 and the fifth frontend module 705. According to an embodiment, the processor 410 may indirectly control the second frontend module 702 and the fifth frontend module 705 by using the transceiver 720.

According to an embodiment, each of the second frontend module 702 and the fifth frontend module 705 may operate to one of the first operation mode and the second operation mode. For example, the processor 410 may set the operation mode of the second frontend module 702 and/or the operation mode of the fifth frontend module 705 as one of the first and second operation modes. For example, the first operation mode may refer to a mode for transmitting (or receiving) a signal based on the wireless LAN. The second operation mode may refer to a mode for transmitting (or receiving) a signal based on the cellular communication (e.g., the 5G NR). For example, the processor 410 may transmit (or receive) a signal based on the wireless LAN, based on setting the operation mode of the second frontend module 702 and the operation mode of the fifth frontend module 705 to the first operation mode.

According to an embodiment, the processor 410 may receive a signal based on the wireless LAN by using two of the second antenna 712, the third antenna 713, the fifth antenna 715, and the sixth antenna 716. For example, the processor 410 may set two of the second antenna 712, the third antenna 713, the fifth antenna 715 and the sixth antenna 716 as antennas for receiving a signal based on the wireless LAN. According to an embodiment, the processor 410 may receive a signal based on the cellular communication by using at least a part of the second antenna 712, the third antenna 713, the fifth antenna 715, and the sixth antenna 716.

The processor 410 may set two of the second antenna 712, the third antenna 713, the fifth antenna 715 and the sixth antenna 716 as antennas for receiving a signal based on the cellular communication. The processor 410 may set two of the second antenna 712, the third antenna 713, the fifth antenna 715 and the sixth antenna 716 as antennas for receiving a signal based on the wireless LAN and/or a signal based on the cellular communication, based on a received signal strength indicator (RSSI).

TABLE 1

| First antenna | Second antenna | Third antenna | Fourth antenna |
|---|---|---|---|
| O | O | | |
| O | | O | |
| O | | | O |
| | O | O | |
| | O | | O |
| | | O | O |

According to an embodiment, the transceiver 720, the second frontend module 702, and the fifth frontend module 705 may be configured (or designed) to support 5G NR 2Tx MIMO. When the transceiver 720, the second frontend module 702, and the fifth frontend module 705 are configured to support the 5G NR 2Tx MIMO, the processor 410 may transmit and/or receive wireless the LAN signal based on 2Tx and 2Rx, by using the second frontend module 702 and the fifth frontend module 705.

According to an embodiment, the transceiver 720, the second frontend module 702, and the fifth frontend module 705 may be configured (or designed) to support only 5G NR 1Tx. When the transceiver 720, the second frontend module 702, and the fifth frontend module 705 are configured to support the 5G NR 1Tx, the processor 410 may transmit and/or receive the wireless LAN signal based on 1Tx and 2Rx, by using the second frontend module 702 and the fifth frontend module 705.

According to an embodiment, when the transceiver 720, the second frontend module 702, and the fifth frontend module 705 are configured to support the 5G NR 1Tx, the processor 410 may transmit a signal based on the wireless LAN by using the first antenna 711 and the fourth antenna 714, and receive a signal based on the wireless LAN by using two of the second antenna 712, the third antenna 713, the fifth antenna 715, and the sixth antenna 716.

Referring to FIG. 8, the electronic device 400 may include a plurality of antennas in the inside of the housing of the electronic device 400 and/or at least a part of the housing. For example, the plurality of antennas may include the first antenna 711 to the sixth antenna 716.

For example, the second antenna 712 and the third antenna 713 may be used to transmit and/or receive a signal based on the cellular communication (e.g., the 5G NR) and/or the wireless LAN. For example, the second antenna 712 and the third antenna 713 may be referred to as a main antenna. In an embodiment, the second antenna 712 and the third antenna 713 may be disposed on the outer side of the housing of the electronic device 400. For example, the second antenna 712 and the third antenna 713 may use a part of a housing formed of metal as an antenna radiator. For example, the second antenna 712 and the third antenna 713 may be disposed on the second portion 820 of the electronic device 400 (e.g., the lower end of the electronic device 400).

For example, the fifth antenna 715 and the sixth antenna 716 may be used to transmit and/or receive a signal based on the cellular communication (e.g., the 5G NR) and/or the wireless LAN. For example, the fifth antenna 715 and the sixth antenna 716 may be referred to as a sub antenna. For example, the fifth antenna 715 may be disposed on the outer side of the housing of the electronic device 400. For example, the sixth antenna 716 may be disposed on the outside or inside of the electronic device 400. For example, the fifth antenna 715 may use a part of a housing formed of metal as an antenna radiator. For example, the sixth antenna 716 may be implemented by using stainless steel. For example, the fifth antenna 715 and the sixth antenna 716 may be disposed on a first portion 810 of the electronic device 400 (e.g., the upper end of the electronic device 400).

For example, the first antenna 711 and the fourth antenna 714 may be used to transmit and receive a signal based on the wireless LAN. For example, the first antenna 711 may be implemented by using a slit formed on at least a part of a metal included in the housing of the electronic device 400. For example, the fourth antenna 714 may be implemented by using laser direct structuring (LDS) inside the housing of the electronic device 400. For example, the first antenna 711 and the fourth antenna 714 may be disposed on the first part 810 (e.g., the upper end of the electronic device 400) of the electronic device 400, together with the fifth antenna 715 and the sixth antenna 716.

According to an embodiment, the processor 410 may communicate through a first link among multi-links by using the first antenna 711 and the fourth antenna 714 disposed in the first portion 810 of the electronic device 400. The processor 410 may communicate through a second link among multi-links by using the second antenna 712 and the third antenna 713 disposed in the second portion 820 of the electronic device 400. For example, the processor 410 may operate in STR mode by performing MLO operation using antennas having designated isolation arranged apart from each other.

The arrangement of the first antenna 711 to the sixth antenna 716 illustrated in FIG. 8 is exemplary, but is not limited thereto. For example, the first antenna 711 to the sixth antenna 716 may be arranged differently according to the form factor of the electronic device 400. According to an embodiment, the electronic device 400 may further include various antennas in addition to the first antenna 711 to the sixth antenna 716.

Figure 9:
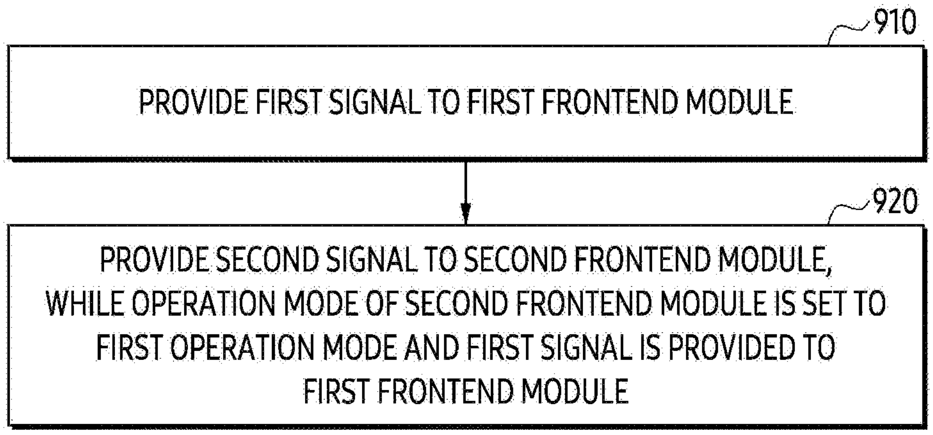
FIG. 9 is a flowchart illustrating an operation of an electronic device, according to an embodiment.

FIG. 9 is a flowchart illustrating an exemplary operation of an electronic device, according to an embodiment.

In the following embodiment, each operation may be performed sequentially, but is not necessarily performed sequentially. For example, the order of each operation may be changed, and at least two operations may be performed in parallel. According to an embodiment, operations 910 and 920 may be understood to be performed in the processor 410 of the electronic device 400 illustrated in FIG. 7.

Referring to FIG. 9, it may be understood that operations 910 and 920 are performed in the processor 410 of the electronic device 400 illustrated in FIG. 7.

In operation 910, the processor 410 may provide the first signal to the first frontend module 701. For example, the processor 410 may provide the first signal in the 5 GHz band and the 6 GHz band to the first frontend module 701, by using the wireless communication circuit 421. For example, the wireless communication circuit 421 may be used for wireless LAN. For example, the wireless communication circuit 421 may be used to transmit and/or receive a signal for the wireless LAN.

According to some embodiments, the first signal may be transmitted through the first antenna 711 electrically connected to the first frontend module 701. For example, the first signal may be set to be transmitted in the 5 GHz band and the 6 GHz band. For example, the first signal may be configured with a bandwidth of 320 MHz or less.

In operation 920, the processor 410 may provide the second signal to the second frontend module 702. For example, the processor 410 may be set to the first operation mode among the first operation mode in which the operation mode of the second frontend module 702 transmits a signal related to the wireless LAN and the second operation modes for transmitting signals related to cellular communication, and provide a second signal in the 5 GHz band and the 6 GHz band to the second frontend module 702, by using a wireless communication circuit 421 while the first signal is provided to the first frontend module 701.

According to an embodiment, the second signal may be transmitted through at least one of the second antenna 712 and the third antenna 713 connected to the second frontend module 702. For example, the second signal may be set to be transmitted in the 5 GHz band and the 6 GHz band. For example, the second signal may be configured with a bandwidth of 160 MHz or less.

According to an embodiment, the processor 410 may provide a third signal in the 2.4 GHz band to the third frontend module 703 by using the wireless communication circuit 421. For example, the third signal may be transmitted through the first antenna 711 electrically connected to the third frontend module 703. For example, the third signal may be set to be transmitted in the 2.4 GHz band. For example, the third signal may be configured with a bandwidth of 20 MHZ.

According to an embodiment, the processor 410 may provide a fourth signal in the 5 GHz band and the 6 GHz band to the fourth frontend module 704 by using the wireless communication circuit 421. For example, the fourth signal may be transmitted through the fourth antenna 714 electrically connected to the fourth frontend module 704. For example, the fourth frontend module 704 may correspond to the first frontend module 701. For example, the fourth frontend module 704 may perform the same or similar function as the first frontend module 701. For example, the fourth frontend module 704 may be set to perform the same or similar function as the first frontend module 701.

According to an embodiment, the processor 410 may provide a fifth signal in the 5 GHz band and the 6 GHz band to the fifth frontend module 705 by using the wireless communication circuit 421 while the operation mode of the fifth frontend module 705 is set to the first operation mode. For example, the fifth signal may be transmitted through at least one of the fifth antenna 715 and the sixth antenna 716 connected to the fifth frontend module 705. For example, the fifth frontend module 705 may correspond to the second frontend module 702. For example, the fifth frontend module 705 may perform the same or similar function as the second frontend module 702. For example, the fifth frontend module 705 may be set to perform the same or similar function as the second frontend module 702.

According to an embodiment, the processor 410 may provide a sixth signal in the 2.4 GHz band to the sixth frontend module 706 by using the wireless communication circuit 421. For example, the sixth signal may be transmitted through the fourth antenna 714 electrically connected to the sixth frontend module 706.

According to an embodiment, the operation mode of the second frontend module 702 may be set to one of the first operation mode and the second operation mode. For example, the processor 410 may set the operation mode of the second frontend module 702 as one of the first operation mode and the second operation mode. For example, the processor 410 may set the operation mode of the second frontend module 702 as the first operation mode, by controlling at least one of a power amplifier (PA), a low noise amplifier (LNA), and a switch circuit included in the second frontend module 702. For example, the first operation mode may refer to an operation mode for transmitting (or receiving) a signal related to the wireless LAN. The second operation mode may refer to an operation mode for transmitting (or receiving) a signal related to the cellular communication (e.g., the 5G NR).

According to an embodiment, the operation mode of the fifth frontend module 705 may be set to one of the first operation mode and the second operation mode. For example, the processor 410 may set the operation mode of the fifth frontend module 705 as one of the first operation mode and the second operation mode. For example, the processor 410 may set the operation mode of the fifth frontend module 705 as the first operation mode by controlling at least one of the power amplifier, the low noise amplifier, and the switch circuit included in the fifth frontend module 705.

According to an embodiment, the processor 410 may set the operation mode of the second frontend module 702 as one of the first operation mode and the second operation mode by using the transceiver 720. The processor 410 may set the operation mode of the fifth frontend module 705 as one of the first operation mode and the second operation mode by using the transceiver 720. For example, the processor 410 may transmit a control signal to the transceiver 720. The transceiver 720 may change the operation mode of the second frontend module 702 and/or the operation mode of the fifth frontend module 705 based on the control signal received from the processor 410.

According to an embodiment, one of the first signal and the third signal may be provided to the first diplexer 731. For example, the first signal may be provided from the wireless communication circuit 421 to the first frontend module 701. The first signal may be provided from the first frontend module 701 to the first diplexer 731. For example, the third signal may be provided from the wireless communication circuit 421 to the third frontend module 703. The third signal may be provided from the third frontend module 703 to the first diplexer 731.

For example, one of the first signal and the third signal may be transmitted by being provided from the first diplexer 731 to the first antenna 711. For example, the first diplexer 731 may include a filter for passing the first signal in the 5 GHz band and the 6 GHz band and a filter for passing the third signal in the 2.4 GHz band.

According to an embodiment, one of the fourth signal and the sixth signal may be provided to the second diplexer 732. For example, the fourth signal may be provided from the wireless communication circuit 421 to the fourth frontend module 704. The fourth signal may be provided from the fourth frontend module 704 to the second diplexer 732. For example, the sixth signal may be provided from the wireless communication circuit 421 to the sixth frontend module 706. The sixth signal may be provided from the sixth frontend module 706 to the second diplexer 732.

For example, one of the fourth signal and the sixth signal may be transmitted by being provided from the second diplexer 732 to the fourth antenna 714. For example, the second diplexer 732 may include a filter for passing the fourth signal in the 5 GHz band and the 6 GHz band and a filter for passing the sixth signal in the 2.4 GHz band.

According to an embodiment, the processor 410 may receive a signal related to the wireless LAN by using at least one (e.g. two) of the second antenna 712, the third antenna 713, the fifth antenna 715, and the sixth antenna 716, while transmitting at least one of the first signal and the fourth signal.

According to an embodiment, the processor 410 may provide at least one signal related to Bluetooth communication to at least one of the third frontend module 703 and the sixth frontend module 706 by using the wireless communication circuit 422. For example, the wireless communication circuit 422 may be used for Bluetooth communication. For example, the wireless communication circuit 422 may be used to transmit and/or receive a signal related to Bluetooth communication.

According to an embodiment, the processor 410 may determine performing multi-links operation (or the MLO operation) in the 5 GHz band and the 6 GHz band. For example, the processor 410 may determine performing communication with at least one external electronic device through the first link and the second link in the 5 GHz band and the 6 GHz band. For example, the processor 410 may set the operation mode of the second frontend module 702 as the first operation mode by using the transceiver 720 based on the determination. For example, the processor 410 may set the operation mode of the fifth frontend module 705 as the first operation mode by using the transceiver 720 based on the determination.

According to an embodiment, the processor 410 may identify a time period for setting the operation mode of the second frontend module 702 and the operation mode of the fifth frontend module 705 to the first operation mode, based on determining to perform the multi-links operation (or the MLO operations) in the 5 GHz band and the 6 GHz band. The processor 410 may transmit and/or receive a signal related to the wireless LAN during the identified time period, based on the operation mode of the second frontend module 702 and the operation mode of the fifth frontend module 705 being set to the first operation mode. The processor 410 may switch the operation mode of the second frontend module 702 and the operation mode of the fifth frontend module 705 from the first operation mode to the second operation mode, based on elapse of the time period identified after the operation mode of the second frontend module 702 and the operation mode of the fifth frontend module 705 are set to the first operation mode.

For example, the processor 410 may communicate with the first external electronic device through the first link among multi-links set in the 5 GHz band and the 6 GHz band, by using at least one of the first frontend module 701 and the fourth frontend module 704. The processor 410 may communicate with the second external electronic device distinguished from the first external electronic device through the second link among multi-links set in the 5 GHz band and the 6 GHz band, by using at least one of the second frontend module 702 and the fifth frontend module 705. For example, the processor 410 may transmit and/or receive a signal (e.g., the first signal and the fourth signal) having a bandwidth of 320 MHz or less through the first link. For example, the processor 410 may transmit and/or receive a signal (e.g., the second signal and the fifth signal) having a bandwidth of 160 MHz or less through the second link.

According to an embodiment, the processor 410 may communicate with the first external electronic device through the first link and the second link set in the 5 GHz band and the 6 GHz band.

According to an embodiment, the processor 410 may determine performing the multi-links operation in the 2.4 GHz band and the 5 GHz or higher band. For example, the processor 410 may set the first link in the 2.4 GHz band and the second link in the 5 GHz or higher band (e.g., the 5 GHz band and the 6 GHz band). For example, the processor 410 may communicate with the first external electronic device through the first link set in the 2.4 GHz band by using at least one of the third frontend module 703 and the sixth frontend module 706, based on determining to perform multi-links operation in the 2.4 GHz band and 5 GHz or higher band. For example, the processor 410 may communicate with the first external electronic device through the first link set in the 2.4 GHz band by using both the third frontend module 703 and the sixth frontend module 706, based on determining to perform multi-links operation in the 2.4 GHz band and 5 GHz or higher band. For example, the processor 410 may communicate with the second external electronic device through the second link set in the 5 GHz or higher band, by using at least one of the first frontend module 701 and the fourth frontend module 704, based on determining to perform multi-links operation in the 2.4 GHz band and 5 GHz or higher band. According to an embodiment, the processor 410 may communicate with the second external electronic device through the second link set in the 5 GHz or higher band, by using at least one of the second frontend module 702 and the fifth frontend module 705, based on determining to perform multi-links operation on the 2.4 GHz band and the 5 GHz or higher band.

Figure 10:
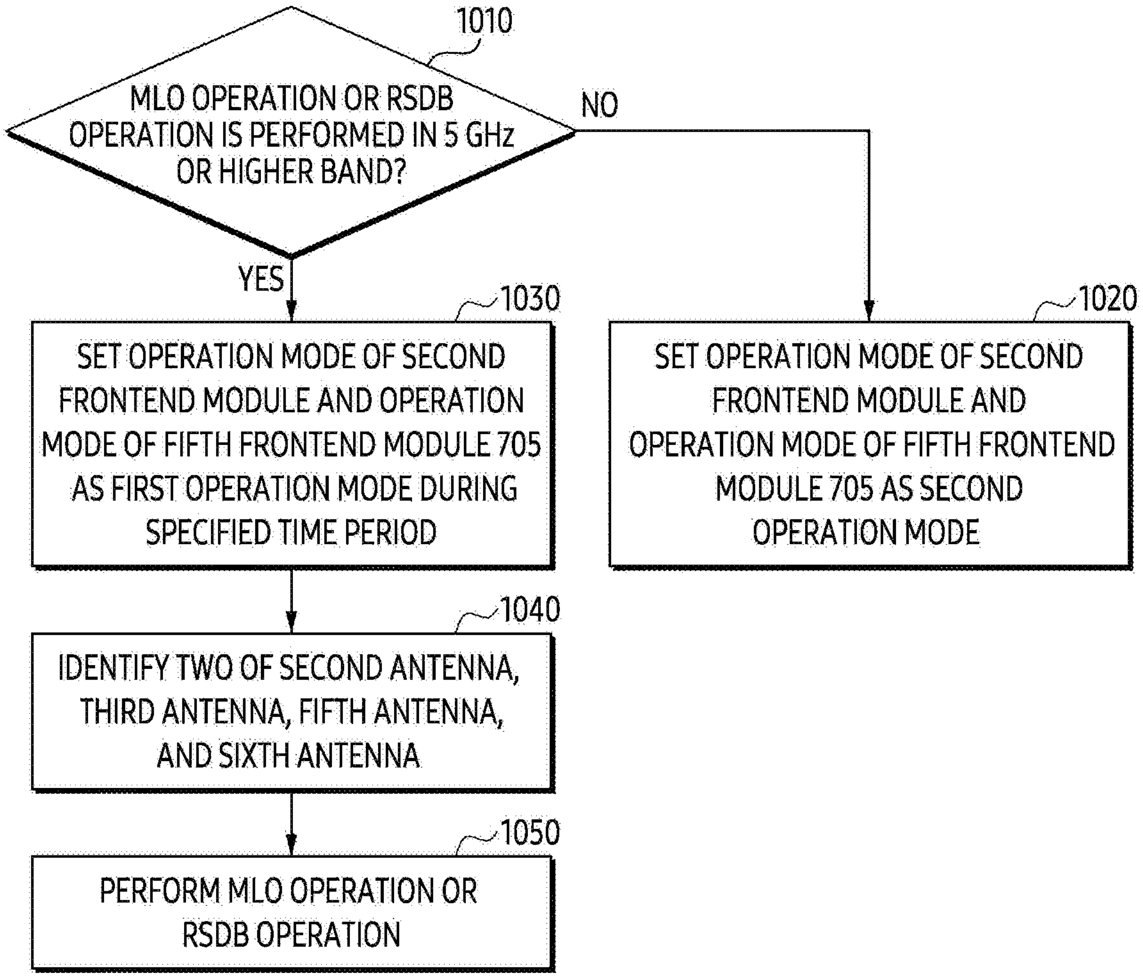
FIG. 10 is a flowchart illustrating an operation of an electronic device, according to an embodiment.

FIG. 10 is a flowchart illustrating an exemplary operation of an electronic device, according to an embodiment.

In the following embodiment, each operation may be performed sequentially, but is not necessarily performed sequentially. For example, the order of each operation may be changed, and at least two operations may be performed in parallel. According to an embodiment, operations 1010 to 1050 may be understood to be performed in the processor 410 of the electronic device 400 illustrated in FIG. 7.

Referring to FIG. 10, in operation 1010, the processor 410 may identify whether the MLO operation or the RSDB operation is performed in the 5 GHz or higher band (e.g., the 5 GHz band and the 6 GHz band). For example, the processor 410 may identify whether the MLO operation or the RSDB operation will be performed in the 5 GHz or higher band. For example, the processor 410 may identify whether the MLO operation or the RSDB operation is required in the 5 GHz or higher band. The processor 410 may identify whether a plurality of links (or a plurality of channels) are set in the 5 GHz or higher band.

In operation 1020, when the MLO operation or the RSDB operation are not performed in the 5 GHz or higher band (e.g., the 5 GHz band and the 6 GHz band), the processor 410 may set the operation mode of the second frontend module 702 and the operation mode of the fifth frontend module 705 to the second operation mode. For example, based on identifying that the MLO operation or the RSDB operation are not performed in the 5 GHz or higher band (e.g., the 5 GHz and the 6 GHz band), the processor 410 may set the operation mode of the second frontend module 702 and the operation mode of the fifth frontend module 705 as the second operation mode. The second operation mode may refer to a mode for transmitting (or receiving) a signal based on the cellular communication (e.g., the 5G NR).

According to an embodiment, the processor 410 may identify that the MLO operation or the RSDB operation is performed in the 2.4 GHz band and the 5 GHz or higher band. For example, the processor 410 may set the first link in the 2.4 GHz band and the second link in the 5 GHz or higher band. The processor 410 may set the operation mode of the second frontend module 702 and the operation mode of the fifth frontend module 705 as the second operation mode, transmit a signal for the wireless LAN through the first link by using at least one of the third frontend module 703 and the sixth frontend module 706, and transmit a signal for the wireless LAN through the second link by using at least one of the first frontend module 701 and the fourth frontend module 704.

According to an embodiment, the processor 410 may identify that the MLO operation or the RSDB operation is performed in the 2.4 GHz band. For example, the processor 410 may set the first link and the second link in the 2.4 GHz band. The processor 410 may set the operation mode of the second frontend module 702 and the operation mode of the fifth frontend module 705 as the second operation mode, and transmit a signal for the wireless LAN through the first link and the second link by using the third frontend module 703 and the sixth frontend module 706.

In operation 1030, when the MLO operation or the RSDB operation is performed in the 5 GHz or higher band (e.g., the 5 GHz band and the 6 GHz band), the processor 410 may set the operation mode of the second frontend module 702 and the operation mode of the fifth frontend module 705 as the first operation mode during the specified time period. For example, based on identifying that the MLO operation or the RSDB operation is performed in the 5 GHz or higher band (e.g., the 5 GHz band and the 6 GHz band), the processor 410 may set the operation mode of the second frontend module 702 and the operation mode of the fifth frontend module 705 as the first operation mode during the specified time period. For example, the first operation mode may refer to a mode for transmitting (or receiving) a signal based on the wireless LAN.

According to an embodiment, the specified time period may refer to a time period for setting the operation mode of the second frontend module 702 and the operation mode of the fifth frontend module 705 to the first operation mode. The processor 410 may set the operation mode of the second frontend module 702 and the operation mode of the fifth frontend module 705 as the first operation mode during the specified time period, in order to avoid collisions between a signal transmitted in a band (e.g., band n77, band n78, and band n79) for the cellular communication (e.g., the 5G NR) and a signal transmitted in a band (e.g., the 5 GHZ band and the 6 GHz band) for the wireless LAN.

In operation 1040, the processor 410 may identify two of the second antenna 712, the third antenna 713, the fifth antenna 715, and the sixth antenna 716, after setting the operation mode of the second frontend module 702 and the operation mode of the fifth frontend module 705 to the first operation mode.

According to an embodiment, the processor 410 may set an antenna used to transmit a signal for the wireless LAN as at least one of the first antenna 711 and the fourth antenna 714. For example, the processor 410 may set the antenna used to transmit a signal for the wireless LAN as two antennas among the first antenna 711 and the fourth antenna 714. For example, the processor 410 may set the antenna used to receive a signal for the wireless LAN as two antennas among the second antenna 712, the third antenna 713, the fifth antenna 715, and the sixth antenna 716.

In operation 1050, based on identifying two of the second antenna 712, the third antenna 713, the fifth antenna 715, and the sixth antenna 716, the processor 410 may perform the MLO operation or the RSDB operation.

For example, the processor 410 may transmit a signal for the wireless LAN by using at least one of the first antenna 711 and the fourth antenna 714, while the operation mode of the second frontend module 702 and the operation mode of the fifth frontend module 705 operate as the first operation mode. The processor 410 may receive a signal for the wireless LAN by using two of the second antenna 712, the third antenna 713, the fifth antenna 715, and the sixth antenna 716, while the operation mode of the second frontend module 702 and the operation mode of the fifth frontend module 705 operate as the first operation mode.

According to an embodiment, an electronic device 400 may comprise a wireless communication circuit 421, a first frontend module(or circuit) 701 connected with the wireless communication circuit 421, a second frontend module(or circuit) 702 connected with the wireless communication circuit 421, a first antenna 711 connected with the first frontend module(or circuit) 701, a second antenna 712 connected with the second frontend module(or circuit) 701, a third antenna 713 connected with the second frontend module(or circuit) 701, and a processor 410. The processor 410 may be configured to provide, using the wireless communication circuit 421, a first signal in 5 GHz band and 6 GHz band to the first frontend module(or circuit) 701. The processor 410 may be configured to, while an operation mode of the second frontend module(or circuit) 702 is set to a first operation mode of the first operation mode for transmitting a signal related to wireless local area network (LAN) and a second operation mode for transmitting a signal related to cellular communication and the first signal is provided to the first frontend module(or circuit) 701, provide, using the wireless communication circuit 421, a second signal in the 5 GHz band and the 6 GHz band to the second frontend module(or circuit) 702. The first signal may be transmitted through the first antenna 711 connected with the first frontend module(or circuit) 701. The second signal may be transmitted through at least one of the second antenna 712 and/or the third antenna 713.

According to an embodiment, the electronic device 400 may comprise a third frontend module(or circuit) 703 connected with the wireless communication circuit 421. The processor 410 may be configured to provide, using the wireless communication circuit 421, a third signal in 2.4 GHz band to the third frontend module(or circuit) 703. The third signal may be transmitted through the first antenna 711.

According to an embodiment, the electronic device 400 may comprise a fourth frontend module(or circuit) 704 connected with the wireless communication circuit 421, a fifth frontend module(or circuit) 705 connected with the wireless communication circuit 421, a fourth antenna 714 connected with the fourth frontend module(or circuit) 704, a fifth antenna 715 connected with the fifth frontend module (or circuit) 705, and a sixth antenna 716 connected with the fifth frontend module(or circuit) 705. The processor 410 may be configured to provide, using the wireless communication circuit 421, a fourth signal in the 5 GHz band and the 6 GHz band to the fourth frontend module(or circuit) 704. The processor 410 may be configured to, while an operation mode of the fifth frontend module(or circuit) 705 is set to the first operation mode, provide, using the wireless communication circuit 421, a fifth signal in the 5 GHz band and the 6 GHz band to the fifth frontend module(or circuit) 705. The fourth signal may be transmitted through the fourth antenna 714 connected with the fourth frontend module(or circuit) 704. The fifth signal may be transmitted through at least one of the fifth antenna 715 and the sixth antenna 716.

According to an embodiment, the electronic device 400 may comprise a sixth frontend module(or circuit) 706 connected with the wireless communication circuit 421. The processor 410 may be configured to provide, using the wireless communication circuit 421, a sixth signal in the 2.4 GHz band to the sixth frontend module(or circuit) 706. The sixth signal may be transmitted through the sixth antenna 716 connected with the sixth frontend module(or circuit) 706.

According to an embodiment, the electronic device 400 may comprise a transceiver 720 for transmitting and receiving a signal related to the cellular communication, connected with the second frontend module(or circuit) 702 and the fifth frontend module(or circuit) 705. The processor 410 may be configured to set, using the transceiver 720, the operation mode of the second frontend module(or circuit) 702 to one of the first operation mode and the second operation mode. The processor 410 may be configured to set, using the transceiver 720, the operation mode of the fifth frontend module(or circuit) 705 to one of the first operation mode and the second operation mode.

According to an embodiment, the processor 410 may be configured to receive a signal related to the wireless LAN by using at least one of the second antenna 712, the third antenna 713, the fifth antenna 715, and/or sixth antenna 716, while transmitting at least one of the first signal and/or the fourth signal.

According to an embodiment, the processor 410 may be configured to determine performing multi-links operation in the 5 GHz band and the 6 GHz band. The processor 410 may be configured to set, based on the determination, the operation mode of the second frontend module(or circuit) 702 to the first operation mode. The processor 410 may be configured to set, based on the determination, the operation mode of the fifth frontend module(or circuit) 705 to the first operation mode.

According to an embodiment, the processor 410 may be configured to identify, based on the determination, a time period for setting the operation mode of the second frontend module(or circuit) 702 and the operation mode of the fifth frontend module(or circuit) 705 to the first operation mode. The processor 410 may be configured to change the operation mode of the second frontend module(or circuit) 702 and the operation mode of the fifth frontend module(or circuit) 705 from the first operation mode to the second operation mode, after the operation mode of the second frontend module(or circuit) 702 and the operation mode of the fifth frontend module(or circuit) 705 are set to the first operation mode, based on elapse of the identified time period.

According to an embodiment, the processor 410 may be configured to perform, using at least one of the first frontend module(or circuit) 701 and/or the fourth frontend module(or circuit) 704, communication with a first external electronic device via a first link of multi-links configured in the 5 GHz band and the 6 GHz band. The processor 410 may be configured to perform, using at least one of the second frontend module(or circuit) 702 and/or the fifth frontend module(or circuit) 706, communication with a second external electronic device distinct from the first external electronic device via a second link of the multi-links.

According to an embodiment, the processor 410 may be configured to receive and transmit, via the first link, a signal with a bandwidth less than or equal to 320 MHZ. The processor 410 may be configured to receive and transmit, via the second link, a signal with a bandwidth less than or equal to 160 MHZ.

According to an embodiment, the processor 410 may be configured to set the operation mode of the second frontend module(or circuit) 702 to the first operation mode by controlling at least one of a power amplifier, a low noise amplifier, and/or a switch circuit which are included in the second frontend module(or circuit) 702. The processor 410 may be configured to set the operation mode of the fifth frontend module(or circuit) 705 to the first operation mode by controlling at least one of a power amplifier, a low noise amplifier, and/or a switch circuit which are included in the fifth frontend module(or circuit) 705.

According to an embodiment, the processor 410 may be configured to determine performing multi-links operation in the 2.4 GHz band and above 5 GHz band. The processor 410 may be configured to perform, based on the determination, communication with a first external electronic device via a first link of multi-links configured in the 2.4 GHz band using at least one of the third frontend module(or circuit) 703 and/or the sixth frontend module(or circuit) 706. The processor 410 may be configured to perform, based on the determination, communication with a second external electronic device distinct from the first external electronic device via a second link of multi-links configured in the 5 GHz band and the 6 GHz band using at least one of the first frontend module(or circuit) 701 and/or the fourth frontend module(or circuit) 704.

According to an embodiment, the electronic device 400 may comprise a first diplexer. One of the first signal and the third signal may be provided to the first diplexer. One of the first signal and the third signal may be transmitted by providing from the first diplexer to the first antenna 711.

According to an embodiment, the electronic device 400 may comprise a second diplexer.

One of the fourth signal and the sixth signal may be provided to the second diplexer. One of the fourth signal and the sixth signal may be transmitted by providing from the second diplexer to the fourth antenna 714.

According to an embodiment, the electronic device 400 may comprise another wireless communication circuit 422 for Bluetooth communication. The processor 410 may be configured to provide, using the other wireless communication circuit 421, at least one signal related to the Bluetooth communication to at least one of the third frontend module (or circuit) 703 and/or sixth frontend module(or circuit) 706.

According to an embodiment, a method of an electronic device 400 may comprise providing, using a wireless communication circuit 421 included in the electronic device 400, a first signal in 5 GHz band and 6 GHz band to a first frontend module(or circuit) 701 included in the electronic device 400 and connected with the wireless communication circuit 421. The method may comprise, while an operation mode of a second frontend module(or circuit) 702 included in the electronic device 400 and connected with the wireless communication circuit 421 is set to a first operation mode of the first operation mode for transmitting a signal related to wireless local area network (LAN) and a second operation mode for transmitting a signal related to cellular communication and the first signal is provided to the first frontend module(or circuit) 701, providing, using the wireless communication circuit 421, a second signal in the 5 GHz band and the 6 GHz band to the second frontend module(or circuit) 702. The first signal may be transmitted through a first antenna 711 included in the electronic device 400 and connected with the first frontend module(or circuit) 701. The second signal may be transmitted through at least one of a second antenna 712 and/or a third antenna 713 which are included in the electronic device 400 and connected with the second frontend module(or circuit) 702.

According to an embodiment, the method may comprise providing, using the wireless communication circuit 421, a third signal in 2.4 GHz band to a third frontend module(or circuit) 703. The third signal may be transmitted through the first antenna 711.

According to an embodiment, the method may comprise providing, using the wireless communication circuit 421, a fourth signal in the 5 GHz band and the 6 GHz band to a fourth frontend module(or circuit) 704 which is included in the electronic device 400 and connected with the wireless communication circuit 421. The method may comprise providing, using the wireless communication circuit 421, a fifth signal in the 5 GHz band and the 6 GHz band to a fifth frontend module(or circuit) 705 included in the electronic device 400 and connected with the wireless communication circuit 421, while an operation mode of the fifth frontend module(or circuit) 705 is set to the first operation mode. The fourth signal may be transmitted through a fourth antenna 714 which is included in the electronic device 400 and connected with the fourth frontend module(or circuit) 704. The fifth signal may be transmitted through at least one of a fifth antenna 715 and/or a sixth antenna 716 which are included in the electronic device 400.

According to an embodiment, the method may comprise providing, using the wireless communication circuit 421, a sixth signal in the 2.4 GHz band to a sixth frontend module (or circuit) 706 which is included in the electronic device 400 and connected with the wireless communication circuit 421. The sixth signal may be transmitted through the sixth antenna 716 connected with the sixth frontend module(or circuit) 706.

According to an embodiment, the method may comprise setting, using the transceiver 720 for transmitting and receiving a signal related to the cellular communication, which is included in the electronic device 400 and connected with the second frontend module(or circuit) 702 and the fifth frontend module(or circuit) 705, the operation mode of the second frontend module(or circuit) 702 to one of the first operation mode and the second operation mode. The method may comprise setting, using the transceiver 720, the operation mode of the fifth frontend module(or circuit) 705 to one of the first operation mode and the second operation mode.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with,"

"coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

a wireless communication circuit;

a first frontend circuit connected to the wireless communication circuit;

a second frontend circuit connected to the wireless communication circuit, wherein the second frontend circuit is configured to operate in a first operation mode or a second operation mode, wherein the first operation mode is for transmitting or receiving a signal for a wireless local area network (WLAN) and wherein the second operation mode is for transmitting or receiving a signal for a cellular communication;

a first antenna connected to the first frontend circuit;

a second antenna connected to the second frontend circuit;

a third antenna connected to the second frontend circuit; and a processor configured to:

determine to perform a multi-links operation in a 5 GHz band or a 6 GHz band, set, based on the determination, an operation mode of the second frontend circuit to the first operation mode, provide, using the wireless communication circuit, a first signal in the 5 GHz band or the 6 GHz band to the first frontend circuit, and while the first signal is being provided to the first frontend circuit and the operation mode of the second frontend circuit is set to the first operation mode, provide, using the wireless communication circuit, a second signal in the 5 GHz band or the 6 GHz band to the second frontend circuit, wherein the first signal is transmitted through the first antenna connected to the first frontend circuit, and wherein the second signal is transmitted through at least one of the second antenna or the third antenna.

2. The electronic device of claim 1, further comprising:

a third frontend circuit connected to the wireless communication circuit and the first antenna, wherein the processor is further configured to provide, using the wireless communication circuit, a third signal in a 2.4 GHz band for the WLAN to the third frontend circuit, and wherein the third signal is transmitted through the first antenna.

3. The electronic device of claim 2, further comprising:

a fourth frontend circuit connected to the wireless communication circuit;

a fifth frontend circuit connected to the wireless communication circuit;

a fourth antenna connected to the fourth frontend circuit;

a fifth antenna connected to the fifth frontend circuit; and a sixth antenna connected to the fifth frontend circuit, wherein the processor is further configured to:

provide, using the wireless communication circuit, a fourth signal in the 5 GHz band or the 6 GHz band for the WLAN to the fourth frontend circuit, and while an operation mode of the fifth frontend circuit is set to the first operation mode, provide, using the wireless communication circuit, a fifth signal in the 5 GHz band or the 6 GHz band for the WLAN to the fifth frontend circuit, wherein the fourth signal is transmitted through the fourth antenna connected to the fourth frontend circuit, and wherein the fifth signal is transmitted through at least one of the fifth antenna or the sixth antenna, connected to the fifth frontend circuit.

4. The electronic device of claim 3, further comprising:

a sixth frontend circuit connected to the wireless communication circuit and to the fourth antenna;

wherein the processor is further configured to:

provide, using the wireless communication circuit, a sixth signal in the 2.4 GHz band for the WLAN to the sixth frontend circuit, and wherein the sixth signal is transmitted through the sixth antenna connected to the sixth frontend circuit.

5. The electronic device of claim 4, further comprising:

a transceiver for transmitting and receiving a signal related to the cellular communication, connected to the second frontend circuit and the fifth frontend circuit;

wherein the processor is further configured to:

set, using the transceiver, the operation mode of the second frontend circuit to one of the first operation mode or the second operation mode, and set, using the transceiver, the operation mode of the fifth frontend circuit to the first operation mode or the second operation mode.

6. The electronic device of claim 5, wherein the processor is further configured to:

while transmitting at least one of the first signal or the fourth signal, receive, using one or more of the second antenna, the third antenna, the fifth antenna, and the sixth antenna, a signal for the WLAN.

7. The electronic device of claim 5, wherein the processor is further configured to:

set, based on the determination, the operation mode of the fifth frontend circuit to the first operation mode.

8. The electronic device of claim 7, wherein the processor is further configured to:

identify, based on the determination, a time period for setting the operation mode of the second frontend circuit and the operation mode of the fifth frontend circuit to the first operation mode, and after the operation mode of the second frontend circuit and the operation mode of the fifth frontend circuit are set to the first operation mode, change, based on elapse of the identified time period, the operation mode of the second frontend circuit and the operation mode of the fifth frontend circuit from the first operation mode to the second operation mode.

9. The electronic device of claim 7, wherein the processor is further configured to:

perform, using at least one of the first frontend circuit or the fourth frontend circuit, communication with a first external electronic device via a first link of a multi-links configured in the 5 GHz band or the 6 GHz band, and perform, using at least one of the second frontend circuit or the fifth frontend circuit, communication with a second external electronic device distinct from the first external electronic device via a second link of the multi-links.

10. The electronic device of claim 9, wherein the processor is further configured to:

receive or transmit, via the first link, a signal with a bandwidth less than or equal to 320 MHz, and receive or transmit, via the second link, a signal with a bandwidth less than or equal to 160 MHz.

11. The electronic device of claim 7, wherein the processor is further configured to:

set the operation mode of the second frontend circuit to the first operation mode by controlling at least one of a power amplifier, a low noise amplifier, or a switch circuit which are included in the second frontend circuit, and set the operation mode of the fifth frontend circuit to the first operation mode by controlling at least one of a power amplifier, a low noise amplifier, or a switch circuit which are included in the fifth frontend circuit.

12. The electronic device of claim 4, wherein the processor is further configured to:

determine to perform a multi-links operation in the 2.4 GHz band and above 5 GHz band, perform, based on the determination, communication with a first external electronic device via a first link of a multi-links configured in the 2.4 GHz band using at least one of the third frontend circuit or the sixth frontend circuit, and perform, based on the determination, communication with a second external electronic device distinct from the first external electronic device via a second link of the multi-links configured in the 5 GHz band or the 6 GHz band using at least one of the first frontend circuit or the fourth frontend circuit.

13. The electronic device of claim 4, further comprising a first diplexer, wherein one of the first signal and the third signal is provided to the first diplexer, and wherein one of the first signal and the third signal is transmitted by providing the one of the first signal and the third signal from the first diplexer to the first antenna.

14. The electronic device of claim 13, further comprising a second diplexer, wherein one of the fourth signal and the sixth signal is provided to the second diplexer, and wherein one of the fourth signal and the sixth signal is transmitted by providing the one of the fourth signal and the sixth signal from the second diplexer to the fourth antenna.

15. The electronic device of claim 4, further comprising a second wireless communication circuit for Bluetooth communication, wherein the processor is further configured to:

provide, using the second wireless communication circuit, at least one signal related to the Bluetooth communication to at least one of the third frontend circuit or the sixth frontend circuit.

16. A method of an electronic device comprising a wireless communication circuit, a first frontend circuit connected to the wireless communication circuit, a second frontend circuit connected to the wireless communication circuit, a first antenna connected to the first frontend circuit, a second antenna connected to the second frontend circuit, and a third antenna connected to the second frontend circuit, wherein the second frontend circuit is configured to operate in a first operation mode or a second operation mode, wherein the first operation mode is for transmitting or receiving a signal for a wireless local area network (WLAN) and wherein the second operation mode is for transmitting or receiving a signal for a cellular communication;

wherein the method comprises:

determining to perform a multi-links operation in a 5 GHz band or a 6 GHz band, setting, based on the determination, an operation mode of the second frontend circuit to the first operation mode, providing, using the wireless communication circuit, a first signal in the 5 GHz band or the 6 GHz band to the first frontend circuit, and while the first signal is being provided to the first frontend circuit and the operation mode of the second frontend circuit is set to the first operation mode, providing, using the wireless communication circuit, a second signal in the 5 GHz band or the 6 GHz band to the second frontend circuit, wherein the first signal is transmitted through the first antenna and connected to the first frontend circuit, and wherein the second signal is transmitted through at least one of the second antenna or the third antenna.

17. The method of claim 16, further comprising providing, using the wireless communication circuit, a third signal in a 2.4 GHz band for the WLAN to a third frontend circuit, wherein the third signal is transmitted through the first antenna.

18. The method of claim 17, further comprising providing, using the wireless communication circuit, a fourth signal in the 5 GHz band or the 6 GHz band for the WLAN to a fourth frontend circuit which is included in the electronic device and connected to the wireless communication circuit, and while an operation mode of a fifth frontend circuit is set to the first operation mode, providing, using the wireless communication circuit, a fifth signal in the 5 GHz band or the 6 GHz band for the WLAN to the fifth frontend circuit included in the electronic device and connected to the wireless communication circuit, wherein the fourth signal is transmitted through a fourth antenna which is included in the electronic device and connected to the fourth frontend circuit, and wherein the fifth signal is transmitted through at least one of a fifth antenna or a sixth antenna, connected to the fifth frontend circuit.

19. The method of claim 18, further comprising providing, using the wireless communication circuit, a sixth signal in the 2.4 GHz band for the WLAN to a sixth frontend circuit which is included in the electronic device and connected to the wireless communication circuit, and wherein the sixth signal is transmitted through the sixth antenna connected to the sixth frontend circuit.

20. The method of claim 19, further comprising:

setting, using a transceiver for transmitting and receiving a signal related to the cellular communication, the transceiver is included in the electronic device and connected to the second frontend circuit and the fifth frontend circuit, the operation mode of the second frontend circuit to the first operation mode or the second operation mode, and setting, using the transceiver, the operation mode of the fifth frontend circuit to the first operation mode or the second operation mode.

* * * * *